United States Patent [19]
Shimamura

[11] Patent Number: 5,838,752
[45] Date of Patent: Nov. 17, 1998

[54] APPARATUS AND METHOD FOR CARRYING OUT WORKINGS AT REACTOR BOTTOM

[75] Inventor: Mitsuaki Shimamura, Yokohama, Japan

[73] Assignee: Kabushiki Kaisha Toshiba, Kawasaki, Japan

[21] Appl. No.: 803,277

[22] Filed: Feb. 20, 1997

[30] Foreign Application Priority Data

Feb. 20, 1996 [JP] Japan .................................. 8-032030

[51] Int. Cl.⁶ ........................ G21C 19/00; G21C 17/08; H04N 7/18
[52] U.S. Cl. ........................ 376/260; 376/248; 376/249; 348/83
[58] Field of Search .................................. 376/248, 245, 376/249, 260, 463; 348/82–84

[56] References Cited

U.S. PATENT DOCUMENTS

| | | | |
|---|---|---|---|
| 4,302,772 | 11/1981 | Gillot | 348/82 |
| 4,424,531 | 1/1984 | Elter et al. | 348/83 |
| 4,650,634 | 3/1987 | Meushcke et al. | 376/248 |
| 5,028,379 | 7/1991 | Faulstich | 376/248 |
| 5,604,532 | 2/1997 | Tillmanns | 348/84 |

FOREIGN PATENT DOCUMENTS 3-82954   4/1991   Japan .
7-35891   2/1995   Japan .

*Primary Examiner*—Charles Jordan
*Assistant Examiner*—Matthew J. Lattig
*Attorney, Agent, or Firm*—Oblon, Spivak, McClelland, Maier & Neustadt, P.C.

[57] ABSTRACT

At a reactor bottom, varieties of work are performed by a working apparatus, the work includes inspecting, cleaning and recovering radioactive corrosion products and other foreign matters deposited or stuck onto a foot mirror of a reactor pressure vessel in a light-water cooling reactor, and cutting, grinding and welding structural members in relation to the foreign matters. The working apparatus includes a body case having a shape of a vertically long tube, having an opening formed in a peripheral surface thereof. The body case being suspended from above the reactor pressure vessel to be installed over an upper end of a control rod driving mechanism housing which is vacant after withdrawal of a control rod driving mechanism from the housing. The working apparatus further includes a turning mechanism for turning the body case about an axis thereof and setting a direction of the opening of the case body, working means housed in the body case, a developing mechanism for projecting and retracting the working means laterally outward through the opening with respect to the body case, a lifting mechanism for moving the working means up and down with respect to the body case, and a transfer mechanism for three-dimensionally transferring the working means, which has been descended by the lifting mechanism, along an upper surface of the foot mirror.

5 Claims, 20 Drawing Sheets

APPARATUS AND METHOD FOR CARRYING OUT WORKINGS AT REACTOR BOTTOM

BACKGROUND OF THE INVENTION

The present invention relates to a technology for carrying out work such as inspecting and/or cleaning (e.g., removing or decontaminating) radioactive corrosion products (clads) and other foreign matters which are deposited or stuck onto the upper surface of a foot mirror, i.e., at the inner bottom of a reactor pressure vessel in a light-water cooling reactor, etc., recovering the foreign matters, or cutting, grinding and/or welding structural members, and more particularly to an apparatus and a method for carrying out work at the reactor bottom which can reduce the exposure rate and improve the working efficiency.

Heretofore, there are known various working apparatus and methods for carrying out work such as cleaning, checking, inspecting and/or repairing structural members in a pressure vessel and a core of a light-water cooling reactor, etc., or equipments and devices in a working pool thereof.

More specifically, on the foot mirror through which control rod driving mechanism housings and stub tubes penetrate at the bottom of a reactor pressure vessel, various foreign matters stuck thereon with light adhesion force, clads taken into and firmly fixed to a metal matrix constituting the foot mirror of the reactor pressure vessel, and so forth are accumulated and deposited. It is therefore required to clean and recover those foreign matters, clads, etc. (hereinafter referred to generally as foreign matters). In connection with cleaning and recovering of the foreign matters, a lot of work including checking, inspecting, cutting, grinding and welding are also performed around the stub tubes.

To that end, varieties of work such as cleaning and recovering the foreign matters have been hitherto carried out by attaching several working means, e.g., a suction nozzle and a brush, to a long pole, moving the working means downward for setting on the foot mirror from above the reactor pressure vessel, and manipulating the long pole. In other words, a long pole is assembled by joining a plurality of poles with simple jigs so as to reach the foot mirror located at a depth of about 26 m in water from the operation floor above the reactor pressure vessel. Then, cleaning and recovering of the foreign matters are performed by manipulating the long pole by workers on a refueling machine or a working carriage, and actuating the working means such as a suction nozzle while moving them around.

However, when varieties of work are to be carried out on the foot mirror by using the conventional technology described above, it is required to remove a control rod guide tube, which is installed above the control rod driving mechanism housings with a core support plate employed as a guide, prior to setting the various working means in place.

At that time, in the conventional method of setting the working means from the above with the long pole and the simple jigs, an area where the working means are operable depends on the size of one hole formed in the core support plate and left open after withdrawing one control rod guide tube. This operation has raised a difficulty in cleaning the foreign matters over a wide region around the operable area corresponding to the hole size, resulting in a certain limitation on the area in which the working means are operable in a condition where one control rod guide tube has been withdrawn.

Accordingly, the conventional method has had drawbacks of requiring a very long working time and hence increasing the working term because a number of control rod guide tubes must be removed to perform the varieties of work all over the foot mirror.

Furthermore, the long pole is so heavy and hard to handle in itself. In addition, since the long pole must be passed through the upper grid plate and the core support plate and manipulated for operation of the working means in water over a distance of about 26 m, the workers encounter difficulty in viewing the working place, the long pole may often flex due to the viscosity of water, and the working efficiency is very poor.

Further, when the long pole is moved to a next working place after one series of operations, the pole end must be lifted up to the upper grid plate. This implies that whenever the long pole is moved to a next working place, it must be disassembled, lifted up, reassembled, and then descended to the working place, and the working efficiency is further reduced.

SUMMARY OF THE INVENTION

An object of the present invention is to substantially eliminate defects or drawbacks encountered in the prior art described above and to provide an apparat us and a method for carrying out work at the reactor bottom which includes work such as inspection, cleaning, removal and/or recovery of foreign matters, or cutting, grinding and/or welding of structural members can be made on a foot mirror of a reactor pressure vessel, to which a suction nozzle cannot be forwarded unless control rod guide tubes are removed, over a wide area by removing control rod guide tubes in reduced number, and therefore which can effectively improve the working efficiency and reduce the amount of works to be done, thereby shortening the working term and reducing the exposure rate.

This and other objects can be achieved according to the present invention by providing, in one aspect, an apparatus for carrying out work at a reactor bottom, the work including inspecting, cleaning and recovering radioactive corrosion products and other foreign matters deposited or stuck onto a foot mirror of a reactor pressure vessel in a light-water cooling reactor, and cutting, grinding and welding structural members in relation to the foreign matters, the apparatus comprising:

a body case having a shape of a vertically long tube, having an opening formed in a peripheral surface thereof, the body case being suspended from above the reactor pressure vessel to be installed over an upper end of a control rod driving mechanism housing which is vacant after withdrawal of a control rod driving mechanism from the housing;

a turning mechanism for turning the body case about an axis thereof and setting a direction of the opening of the case body;

working means housed in the body case;

a developing mechanism for projecting and retracting the working means laterally outward through the opening with respect to the body case;

a lifting mechanism for moving the working means up and down with respect to the body case; and a transfer mechanism for three-dimensionally transferring the working means, which has been descended by the lifting mechanism, along an upper surface of the foot mirror, said transfer mechanism comprising a linear guide member holding said working means at a distal end thereof, extending downward from said lifting mechanism and being bendable in one direction, and a tip oscillating mechanism provided at a distal end of said guide member and having a degree of freedom for actively moving said working means on a horizontal plane, a degree of freedom for moving said working means in the vertical direction and a degree of freedom for rotating said working means about an axis thereof in a direction in which said working means is to be transferred.

In preferred embodiments, the working means is cleaning means, which comprises brushing means for peeling off foreign matters stuck to the upper surface of the foot mirror of the reactor pressure vessel, a suction nozzle for sucking the foreign matters floated by being peeled off by the brushing means and a hose for recovering the sucked foreign matters therethrough. The working means may be cleaning means, which comprises brushing means for peeling off foreign matters stuck to the upper surface of the foot mirror of the reactor pressure vessel, a suction nozzle for sucking the foreign matters floated by being peeled off by the brushing means, a monitoring camera and light means cooperating to allow an operator to confirm a sucking condition and a hose for recovering the sucked foreign matters therethrough.

The brushing means is a rotatable brush or a rotatable grinder and frictional forces produced upon a rotation of the rotatable brush or rotatable grinder are enough to ionize and peel off clads taken into and firmly bonded to a metal matrix of the foot mirror of the reactor pressure vessel.

The working means may be an inspecting device comprising a camera for inspection for visually inspecting surfaces or weld joints of the structural members at the reactor bottom and light means for inspection. The working means may be an ultrasonic flaw detecting device for performing ultrasonic flaw detection on weld joints of the structural members at the reactor bottom. The working means may be a cutting device for cutting the structural members at the reactor bottom. The working means may be a grinding device for grinding the structural members at the reactor bottom, or a welding device for welding the structural members at the reactor bottom.

The transfer mechanism is capable of moving the suction nozzle into a gap area between stub tubes while following a curvature of the foot mirror of the reactor pressure vessel.

The transfer mechanism may comprise a linear guide member holding the working means at a distal end thereof, extending downward from the lifting mechanism and being bendable only in one direction, a tip oscillating mechanism provided at a distal end of the guide member and having a degree of freedom for actively moving the working means on a horizontal plane, a degree of freedom for moving the working means in the vertical direction, and a degree of freedom for rotating the working means about an axis thereof in a direction in which the working means is to be transferred, and a monitoring camera for grasping an advancement condition of the guide member, the transfer mechanism moving the suction nozzle into a gap area between stub tubes while following a curvature of the foot mirror of the reactor pressure vessel and to monitor a condition of the suction nozzle under movement by the monitoring camera.

The linear guide member constituting the transfer mechanism and being bendable only in one direction is a cable bearer, and the tip oscillating mechanism provided at a distal end of the cable bearer includes an electric-powered actuator as a driving source for moving the working means on a horizontal plane. The tip oscillating mechanism constituting the transfer mechanism includes a wire driving mechanism as a driving source for moving the working means on a horizontal plane. The tip oscillating mechanism includes a heat control mechanism combined with a shape memory alloy as a driving source for moving the working means on a horizontal plane, or comprises a multi-articulated arm.

The transfer mechanism comprises a linear guide member holding the working means at a distal end thereof, extending downward from the lifting mechanism and being bendable only in one direction, and a tip oscillating mechanism provided at a distal end of the guide member and having a degree of freedom for actively moving the working means on a horizontal plane, a degree of freedom for moving the working means in the vertical direction, and a degree of freedom for rotating the working means about an axis thereof in a direction in which the working means is to be transferred, and a camera for grasping a work condition of the working means, the transfer mechanism moving the working means into a gap area between stub tubes while following a curvature of the foot mirror of the reactor pressure vessel and to inspect the reactor bottom by using a camera for inspection or an ultrasonic probe.

The developing mechanism comprises, at least, two links driven by actuating means such as an air cylinder.

The lifting mechanism comprises at least a chain and a sprocket cooperating to move said working means up and down. The turning mechanism is constructed to rotate the body case mounted on the control rod driving mechanism housing in a horizontal plane while a positioning pin vertically provided on a core support plate serves as a reference.

The apparatus may further comprises means for carrying out works of inspecting and cleaning an upper surface of the foot mirror at the bottom of the reactor pressure vessel, recovering foreign matters, or cutting, grinding and welding the structural members, a control board and a console both installed for remote control on an operation floor in an upper portion of the reactor pressure vessel, a suspension apparatus including a carriage for suspending and moving the body case up and down, and a suction pump and a recovery filter installed in water for cleaning work.

In another aspect of the present invention, there is provided a method for carrying out work at a reactor bottom, the work including inspecting and cleaning an upper surface of a foot mirror at the bottom of a reactor pressure vessel, recovering foreign matters, and cutting, grinding and welding structural members, by using the apparatus of the structure mentioned above, the method comprising the steps of:

moving a body case down through an upper grid plate and a core support plate by the suspension apparatus;

fixedly mounting the body case on the control rod driving mechanism housing;

determining a direction, in which the working means is to be advanced, by the turning mechanism;

developing the lifting mechanism and the transfer mechanism laterally outward of the body case by the developing mechanism;

descending the transfer mechanism onto the foot mirror of the reactor pressure vessel by the lifting mechanism;

advancing the working means to crawl on the foot mirror by the transfer mechanism after the working means has reached the foot mirror; and inspecting and cleaning areas on the foot mirror between stub tubes, sucking and recovering foreign matters, or cutting, grinding and welding the structural members in relation to the foreign matters, while the working means is moved by the transfer mechanism.

According to the structures and characters of the present invention described above, since work, such as cleaning of the reactor bottom, recovery of foreign matters, visual inspection, or cutting, grinding and/or welding of structural members, can be automatically performed under remote control and any work can be made over a wide area by installing the apparatus in one position, the work can be carried out all over a foot mirror of a reactor pressure vessel reducing the number of times that the apparatus is installed. It is therefore possible to facilitate processes of the varieties of work and reduce the number of control rod guide tubes to be removed, which contributes to improving the working efficiency and cutting down the working term.

The foreign matters can be scraped off and collected by the brushing means and recovered through the suction nozzle and the hose. Therefore, in contrast with the case of sucking foreign matters by the suction nozzle alone, not only those foreign matters which are peeled off due to viscosity based on fluid dynamics, but also those foreign matters which are stuck with light adhesion forces and peeled off by mechanical forces, can be recovered by moving the brush to wipe over a surface to be cleaned. As a result, cleaning ability is increased.

The clads and other foreign matters can be scraped off and collected by the brushing means and recovered through the suction nozzle and the hose. At the same time, the sucking condition can be monitored or observed by using the monitoring camera. Therefore, in contrast with the case of sucking foreign matters by the suction nozzle alone where only those clads and foreign matters which are peeled off due to viscosity based on fluid dynamics can be recovered, those clads and foreign matters which are stuck with light adhesion forces and peeled off by mechanical forces can also be recovered by moving the brush to wipe over a surface to be cleaned. As a result, a cleaning ability is increased. In addition, since the cleaning work can be performed while an operator is visually confirming the sucking condition, reliability of the work is increased.

Since the apparatus includes, as the working means, a camera for visually inspecting surfaces or weld joints of the structural members at the reactor bottom, and a light for illumination, so that the reactor bottom can be visually inspected. Therefore, the visual inspection can be performed over a wide area by installing the apparatus in one position.

Since the apparatus includes, as the working means, an ultrasonic probe for performing ultrasonic flaw detection on weld joints of the structural members at the reactor bottom so that the reactor bottom can be checked by the ultrasonic flaw detection. Therefore, the ultrasonic flaw detection can be performed over a wide area by installing the apparatus in one position.

Since the apparatus includes, as the working means, a cutting device so that cutting work can be performed at the reactor bottom. It is therefore possible to perform the cutting work over a wide area by installing the apparatus in one position.

Since the apparatus includes, as the working means, a grinding device for grinding the structural members at the reactor bottom so that grinding work can be performed at the reactor bottom. It is therefore possible to perform the grinding work over a wide area by installing the apparatus in one position.

Since the apparatus includes, as the working means, a welding device for welding the structural members at the reactor bottom so that welding work can be performed at the reactor bottom. It is therefore possible to perform the welding over a wide area by installing the apparatus in one position.

Furthermore, the suction nozzle can be moved into a gap area between the stub tubes while following the curvature of the foot mirror, enabling foreign matters to be surely sucked from all areas. Further, the condition of the suction nozzle set on the foot mirror, the condition of the suction nozzle and the bendable guide member being advanced on the foot mirror, etc. can be visually confirmed with the monitoring camera. As a result, operability of the apparatus during work can be increased.

The ultrasonic probe can be moved into a gap area between the stub tubes while following the curvature of the foot mirror. Further, the condition of the ultrasonic probe set on the foot mirror, the condition of the ultrasonic probe and the bendable guide member being advanced on the foot mirror, etc. can be visually confirmed with the monitoring camera. As a result, operability of the apparatus during work can be increased.

Since the developing mechanism comprises, at least, two links driven by an air cylinder or other direct-actuating element, the lifting mechanism and the transfer mechanism can be developed and retracted with respect to the body case by turning the links in the vertical direction. In a developed state, the lifting means can move the transfer means up and down. Further, since the lifting mechanism and the transfer mechanism are developed while descending from their retracted positions, this means that the stroke to be covered by the lifting means is partly provided by the turning of the links and, correspondingly, the space which is occupied by the internal mechanisms of the apparatus is reduced, resulting in smaller weight of the apparatus. Further, the use of the links for developing the lifting mechanism and the transfer mechanism can provide a large development stroke with a simple structure.

The lifting mechanism comprises a chain and a sprocket which cooperate to vertically move the transfer mechanism and make the suction nozzle land on the foot mirror. Therefore, the transfer mechanism can be moved over a long stroke at high speed with a simple structure. It is thus possible to improve reliability of the apparatus and reduce weight of the apparatus.

The turning mechanism is constructed to rotate the body case mounted on the control rod driving mechanism housing and determine a direction in which the cleaning means is to be advanced, while a positioning pin provided on the core support plate serves as a reference. Therefore, the suction nozzle can be advanced in at least four directions with angular intervals of 90° by installing the body case in one position. As a result, work can be performed over a wide area in the reduced number of times that the apparatus is installed.

Furthermore, since the brushing means such as a rotatable brush or a grinder is rotated to wipe over the foot mirror in the area from which foreign matters are sucked and recovered, clads can be peeled off even with the suction nozzle kept at a standstill. This increases an ability of peeling off foreign matters, resulting in the improved recovery efficiency of clads and the reduced air dose outside the reactor.

Since the guide member constituting the transfer mechanism and being bendable only in one direction has a cable bearer, the working means can be advanced with its distal end moving in a certain direction. Also, by using an electric-powered actuator, it is possible to easily and precisely control the position and speed at which the working means is oscillated.

Since the transfer mechanism moves the tip oscillating mechanism horizontally by wire driving, the driving source can be separated from the sucking portion and the structure is simplified. In addition, clads are prevented from entering the driving source and reliability can be improved.

Since the transfer mechanism moves the tip oscillating mechanism horizontally under heating control of a shape memory alloy, the arrangement and structure are simplified and reliability can be improved.

Furthermore, since the tip oscillating mechanism comprises a multi-articulated arm so that the sucking portion can be moved to any desired position on the foot mirror by driving respective articulations of the arm, the suction nozzle can be given a degree of freedom for actively moving it. It is thus possible to achieve more complicated work and further improve an ability of gaining access to any place.

Furthermore, since varieties of work can be automatically performed under remote control from a stationary position on the operation floor, it is possible to perform the work more easily.

Still furthermore, according to the method for carrying out work at the reactor bottom, in contrast with the conventional working process wherein a long pole is moved down through the upper grid plate and the core support plate, and foreign matters are sucked by a suction nozzle attached to a tip of the long pole, operations such as changing the work position are facilitated and work can be more easily implemented all over the foot mirror in a shorter period of time, resulting in improved working efficiency and shorter terms of work.

The nature and further characteristic features will be made clear from the following descriptions made with reference to the accompanying drawings.

BRIEF DESCRIPTION OF THE DRAWINGS

In the accompanying drawings:

FIG. 7 is a view for explaining operation of the first embodiment, in which

FIG. 8 is a view for explaining operation of the first embodiment, in which

FIG. 9 is a view for explaining operation of the first embodiment, in which

FIG. 10 is a view for explaining operation of the first embodiment, in which

DESCRIPTION OF THE PREFERRED EMBODIMENTS

Several preferred embodiments of an apparatus and a method for carrying out workings at the reactor bottom according to the present invention will be described hereunder with reference to the drawings. Further, it is to be noted that the apparatus and the method for carrying out the workings at the reactor bottom may be called working apparatus and working method hereinlater.

First Embodiment (FIGS. 2 to 19)

In this embodiment, the apparatus and the method for carrying out work at the reactor bottom according to the present invention are applied to inspecting and/or cleaning the entire upper surface of a foot mirror of a reactor pressure vessel in a light-water cooling reactor, or removing and/or recovering foreign matters therefrom.

Figure 1:
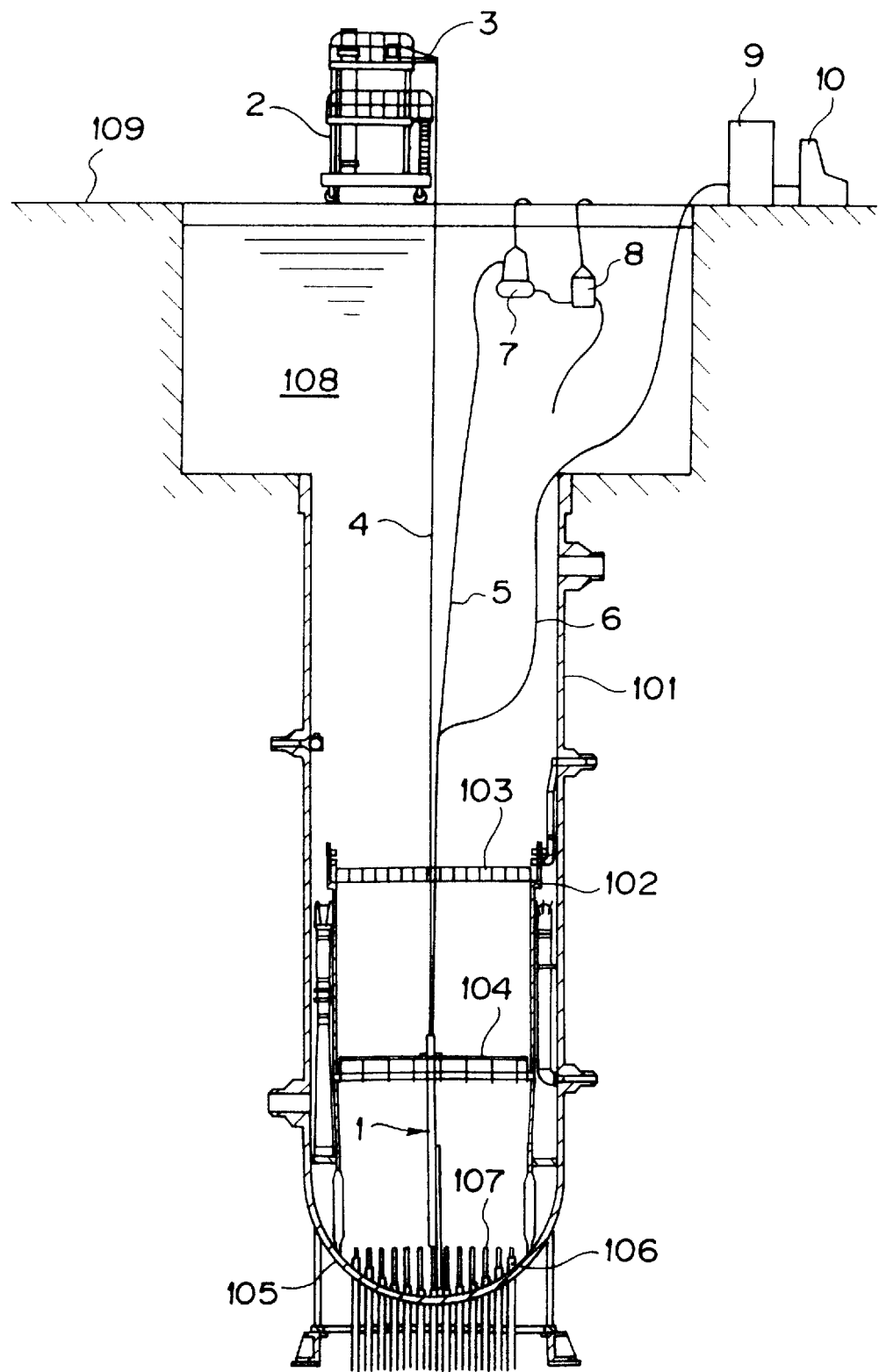
FIG. 1 is a view showing a first embodiment of an apparatus for carrying out work at the reactor bottom according to the present invention, the apparatus being in an installed state.

FIG. 1 shows an entire system construction of the working apparatus in a state where the apparatus is installed in a reactor pressure vessel from which nuclear fuel, control rods, control rod driving mechanisms and so on are omitted.

In a reactor pressure vessel 101, an upper grid plate 103 and a core support plate 104 are disposed and supported in upper and lower portions of a core shroud 102, respectively. A number of stub tubes 106 penetrate a foot mirror 105 at the bottom of the reactor pressure vessel 101, and a control rod driving mechanism housing 107 is projected upward of the top of each stub tube 106. Water is filled in the reactor pressure vessel 101 and a reactor well 108 located above the reactor pressure vessel 101.

A reactor bottom cleaning/working apparatus 1 according to this embodiment is installed between the core support plate 104 and the control rod driving mechanism housing 107 while it is suspended by a wire 4 from a hanging device 3 of a working carriage 2 mounted on an operation floor 109. Connected to the reactor bottom cleaning/working apparatus 1 are a suction hose 5 and a cable 6. The suction hose 5 is coupled to a suction pump 7 and a recovery filter 8 both suspended in the reactor well 108, whereas the cable 6 is coupled to a control board 9 and a console 10 both installed on the operation floor 109.

When the reactor bottom cleaning/working apparatus 1 is installed, it is suspended and descended to a bottom portion in the reactor pressure vessel 101 by the wire 4 from the hanging device 3 mounted on the working carriage 2 on condition that the reactor well 108 is fully filled with water. This allows the reactor bottom cleaning/working apparatus 1 to pass both the upper grid plate 103 and the core support plate 104 for installation on the control rod driving mechanism housing 107.

In this embodiment, the reactor bottom cleaning/working apparatus 1 operates, in such an installed state, to clean an upper surface of the foot mirror 105 and suck foreign matters, etc. deposited on the foot mirror 105 by the suction pump 7 through the suction hose 5 for recovering them with the recovery filter 8. The water from which the foreign matters have been removed with the recovery filter 8 is returned into the reactor. The cleaning operation and control of the reactor bottom cleaning/working apparatus 1 is performed from the control board 9 and the console 10 both installed on the operation floor 109 by processes of, such as, supplying a drive current and transmitting and receiving signals through the cable 6.

A detailed construction and operation of the reactor bottom cleaning/working apparatus 1 will now be described with reference to FIGS. 2 to 19.

Figure 2:
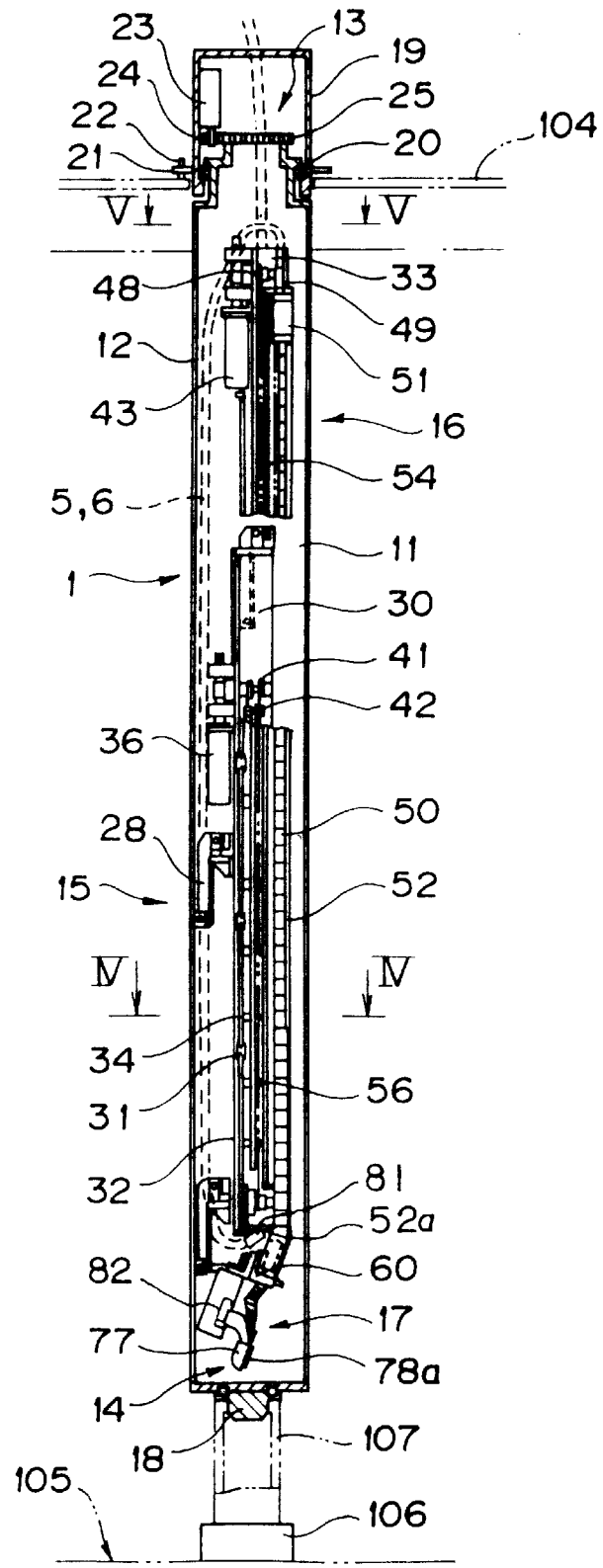
FIG. 2 is a view showing a general construction of the first embodiment of the apparatus for carrying out work at the reactor bottom according to the present invention.

FIG. 2 is a cross-sectional view showing a general construction of the reactor bottom cleaning/working apparatus 1. As shown in FIG. 2, the reactor bottom cleaning/working apparatus 1 mainly comprises a body case 12 in the form of a vertically long tube having an opening 11 defined in its side wall, a turning mechanism 13 for turning the body case 12 about its axis to set a direction of the opening 11, a cleaning means 14 housed as working means in the body case 12 for removing the foreign matters, a developing mechanism 15 for projecting and retracting the cleaning means 14 laterally outward and inward through the opening 11 with respect to the body case 12, a lifting mechanism 16 for ascending and descending the cleaning means 14 with respect to the body case 12, and a transfer mechanism 17 for three-dimensionally transferring the cleaning means 14, which has been descended by the lifting mechanism 16, over the upper surface of the foot mirror 105.

The opening 11 in the side wall of the body case 12 is opened at an angle larger than 90° in a horizontal cross-section, looking from the axis of the body case 12 (see FIGS. 3 to 6). Then, as described later, the cleaning means 14 is developed by the developing mechanism 15 laterally outward of the body case 12 through the opening 11. A downward support projection 18 having a diameter slightly smaller than the inner diameter of a top opening of the control rod driving mechanism housing 107 is provided at a lower end of the body case 12 and rotatably fitted to the top opening of the control rod driving mechanism housing 107. The body case 12 has a diameter over most part of its length smaller than that of a fuel support hole defined in the core support plate 104 so that the body case can be easily inserted through the core support plate 104.

The body case 12 has an upper end portion which has a smaller diameter than the remaining portion and is rotatable by the turning mechanism 13 about the vertical axis in the fuel support hole of the core support plate 104. More specifically, a tubular upper case 19 opened at its lower end is fitted in concentric relation over the upper end portion of the body case 12, and the body case 12 is rotatably supported by the upper case 19 through a bearing 20 mounted in an opening at the lower end thereof. A positioning flange 21 is radially projected from an outer peripheral surface of the upper case 19 at the lower end thereof and rests on an upper surface of the core support plate 104. A positioning pin 22 is vertically provided on the upper surface of the core support plate 104 and engaged in a hole bored through the positioning flange 21, thereby checking rotation of the upper case 19.

A turning motor 23 as one component of the turning means 13 is disposed in the upper case 19, and a pinion 24 is attached to an output shaft of the turning motor 23. On the other hand, a gear 25 is integrally provided at an upper end of the body case 12 and meshed with the pinion 24 to make up a spur gear mechanism. When the turning motor 23 is energized for rotation, the body case 12 is rotated about the vertical axis through the pinion 24 and the gear 25, enabling the opening 11 of the body case 12 to face in any desired direction. Note that the load of the entire apparatus is borne by the upper case 19.

Figure 3:
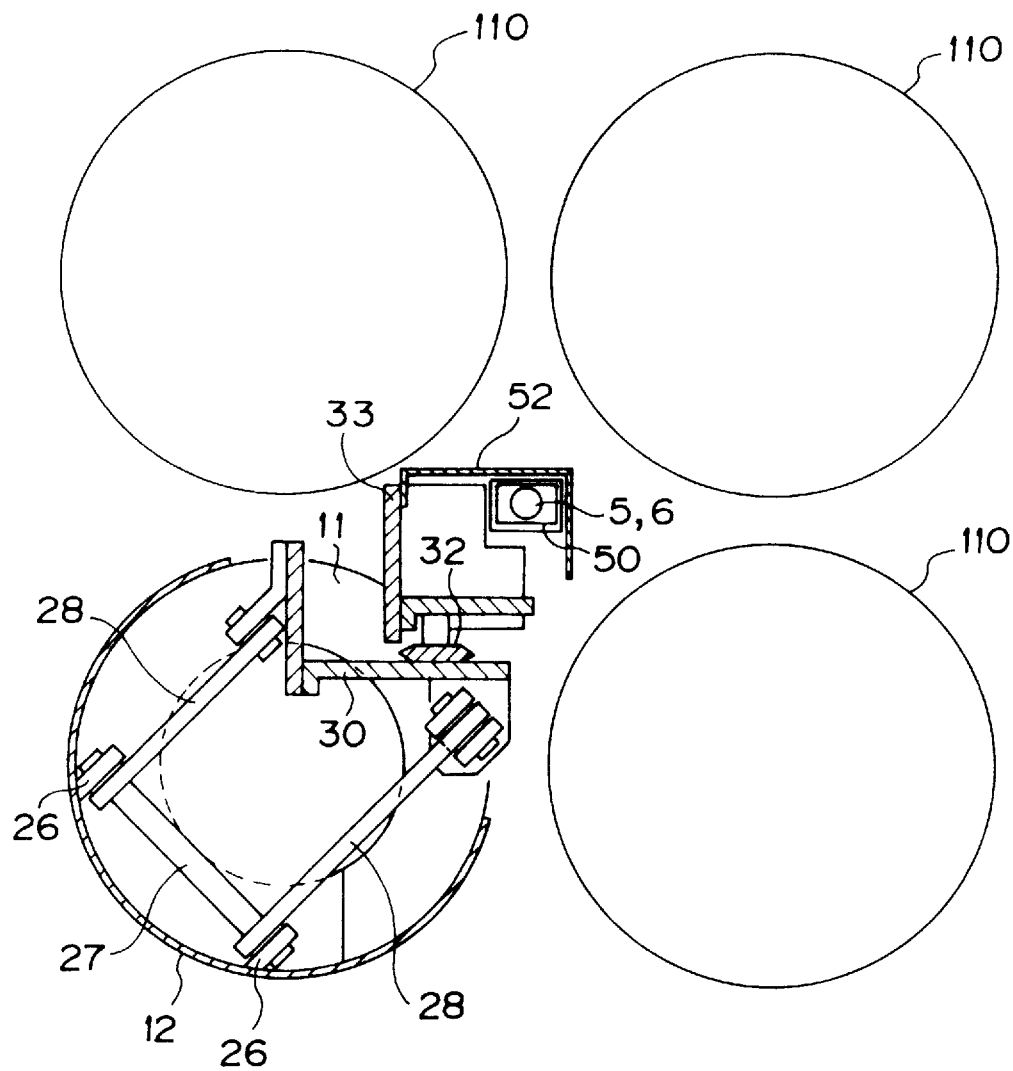
FIG. 3 is a horizontal cross-sectional view showing a developing mechanism in the first embodiment.

The developing mechanism 15 for developing the cleaning means 14 laterally outward of the body case 12 through the opening 11 will now be described with reference to FIGS. 3 and 4 as well. FIG. 3 is a horizontal cross-sectional view showing the developing mechanism 15 (in a developed state) and FIG. 4 is a cross-sectional view (in a retracted state) taken along line IV—IV in FIG. 2.

Figure 4:
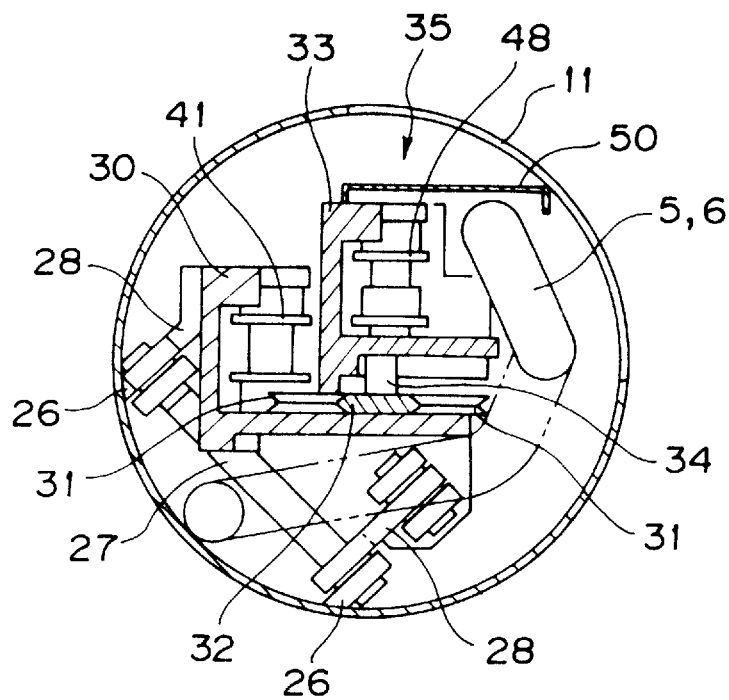
FIG. 4 is a cross-sectional view taken along line IV—IV in FIG. 2.

As shown in FIGS. 2 to 4, a pair of left and right brackets 26 are provided in the body case 12 in two positions vertically spaced from each other and opposed to the opening 11. A pair of vertically spaced developing links 28 are supported on each of the left and right sides by support shafts 27 lying perpendicularly to the brackets 26. The developing links 28 are each coupled to an air cylinder 29 as a direct-actuating element (the air cylinder is not shown in FIGS. 2 to 4 for the sake of avoiding intricacy of the illustrated structure, but it is denoted by 29 in FIGS. 7 to 10 which are shown in the simplified form for explanation of the operation). Driving forces of the air cylinders 29 cause all the developing links 28 to turn at a time with their one ends supported by the support shaft 27 as fulcrums so that the other ends of the developing links 28 are moved up and down to retract and develop respectively. Thus, FIGS. 2 and 4 shows a retracted (folded) state where the one (lower) ends of the developing links 28 are supported in the fixed positions and the other (upper) ends thereof are raised.

FIG. 3 shows a developed (unfolded) state where the developing links 28 are turned about the shaft 27 into a nearly horizontal posture and developed in a direction facing the opening 11 of the body case 12. A lifting base 30 as one component of a lifting mechanism 16 is fixed to and supported by the other (distal) ends of the developing links 28. In the developed state shown in FIG. 3, the cleaning means 14 is developed along with the lifting mechanism 16, shown in FIG. 2, laterally outward of the body case 12.

Figure 5:
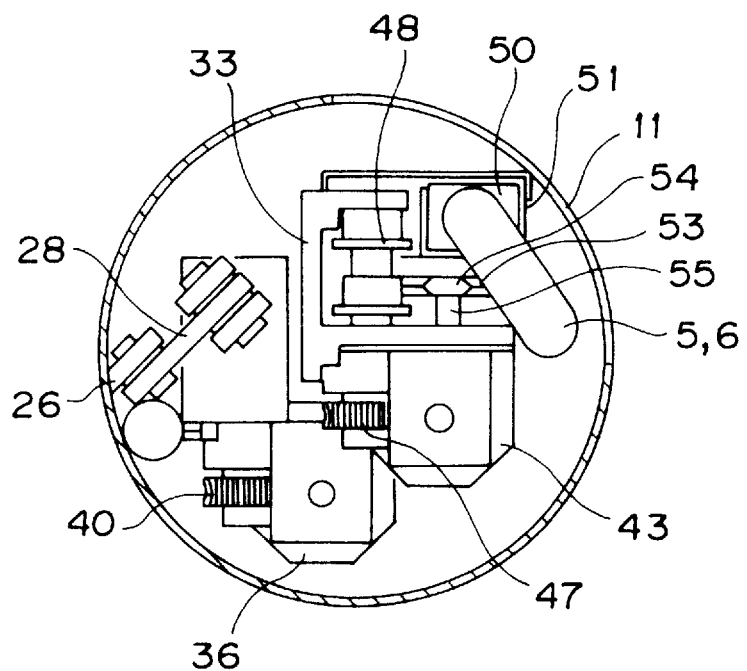
FIG. 5 is a cross-sectional view taken along line V—V in FIG. 2.

The lifting mechanism 16 will now be described with respect to FIGS. 5 and 6. FIG. 5 is a cross-sectional view taken along line V—V in FIG. 2 and FIG. 6 is an enlarged cross-sectional view showing FIG. 5 in more detail.

As shown in these drawings, the lifting mechanism 16 is constructed on a lifting base 30, as a base body, fixedly supported by the developing links 28. More specifically, the lifting base 30 is in the form of a vertically long beam being substantially L-shaped in horizontal cross-section, and fixedly supported at upper and lower ends by the vertically spaced developing links 28. The lifting base 30 is thereby always held in a vertical posture in a laterally movable manner. Further, as shown in FIGS. 2 and 4, plural pairs of lifting guide rollers 31 each having a V-shaped groove formed in its outer circumferential surface are arranged on the lifting base 30 in vertically spaced relation such that each pair of lifting guide rollers 31 are positioned side by side at the same level with the V-shaped grooves opposed to each other. A lifting V-rail guide 32 which is vertically long and has opposite side edges each projecting in a V-shape engages the lifting guide rollers 31 to be held between the rollers 31 lying on both sides. The lifting V-rail guide 32 is therefore vertically movable while being guided by the lifting guide rollers 31. As shown in FIGS. 3 and 4, the lifting V-rail guide 32 is joined through a plurality of vertically spaced connecting rods 34 to a vertically long advancement base 33 which is substantially L-shaped in horizontal cross-section and arranged in parallel to the lifting base 30 on the opposite side of the lifting base 30 with respect to the developing links 28. In other words, the advancement base 33 is supported to be vertically movable relative to the lifting base 30 through the lifting V-rail guide 32 and the lifting guide rollers 31. Incidentally, the advancement base 33 serves as a base for an advancement mechanism 35 for advancing the transfer mechanism 17 for the cleaning means 14 into a cleaning position.

Figure 6:
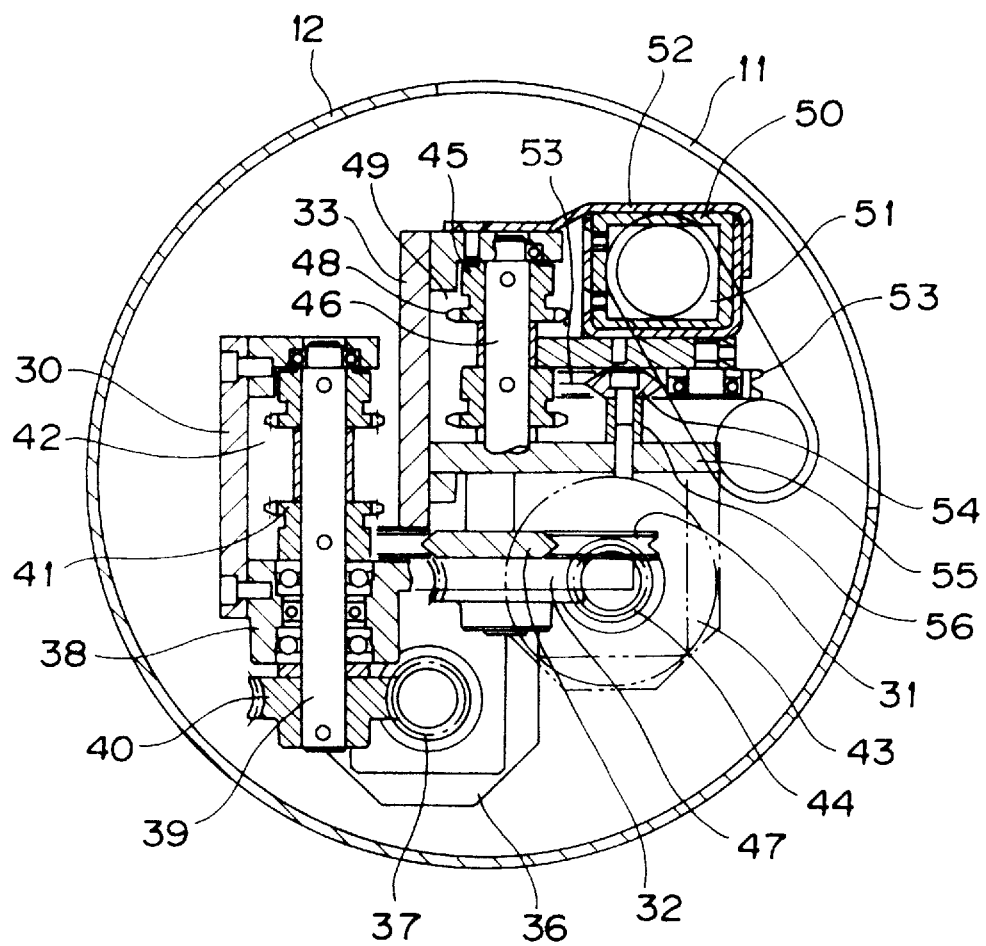
FIG. 6 is a horizontal cross-sectional view showing a lifting mechanism in the first embodiment.

Further, as shown in FIGS. 5 and 6, a lifting motor unit 36 is attached to the lifting base 30. A worm 37 is fitted over an output shaft of the lifting motor unit 36, and a worm wheel 40 fitted over a horizontal sprocket shaft 39 is attached to the lifting base 30 through a bearing 38 such that the worm 37 and the worm wheel 40 have axes lying in orthogonal relation. The worm 37 is meshed with the worm wheel 40 to drive the sprocket shaft 39 for rotation. A lifting sprocket 41 is fitted over the sprocket shaft 39 to be rotatable along with it, and a lifting chain 42 extending in the vertical direction is engaged with the lifting sprocket 41 and has an opposite end fixedly connected to the advancement base 33.

Accordingly, when the lifting motor unit 36 is energized for rotation, the advancement base 33 is driven to move up and down relative to the lifting base 30 through the worm 37, the worm wheel 40, the lifting sprocket 41 and the lifting chain 42.

Moreover, as shown in FIGS. 2 and 6, an advancement motor unit 43 is attached to the advancement base 33. A worm 44 is fitted over an output shaft of the advancement motor unit 43, and a worm wheel 47 fitted over a horizontal sprocket shaft 46 is attached to the advancement base 33 through a bearing 45 such that the worm 44 and the worm wheel 47 have axes lying in orthogonal relation. The worm 44 is meshed with the worm wheel 47 to drive the sprocket shaft 46 for rotation. An advancement sprocket 48 is fitted over the sprocket shaft 46 to be rotatable therewith, and a lifting chain 49 extending in the vertical direction is engaged with the advancement sprocket 48 and has an opposite end fixedly connected through a cable bearer fixture 51 to a linear guide member, i.e., a cable bearer 50, as one component of the transfer mechanism 17. Accordingly, the cable bearer 50 is movable up and down relative to the advancement base 33.

More specifically, the cable bearer 50 is made up of a number of elements coupled each other in such a manner as able to bend in one direction and, as shown in FIG. 6, it is extended vertically while being guided by an advancement guide 52 which is in the form of a vertically long plate and attached to the advancement base 33. The cable bearer fixture 51 is in the form of a frame integrally coupled to an upper end of the cable bearer 50 so that the cable bearer 50 is let out downward or withdrawn upward along with the cable bearer fixture 51.

The cable bearer fixture 51 is supported by the vertically long advancement guide 52, which is attached to the advancement base 33, to be movable in the vertical direction through basically the same relatively sliding structure as that between the lifting base 30 and the advancement base 33. The cable bearer fixture 51 is thus driven by the advancement chain 49 to move up and down.

To explain it in more detail, as shown in FIG. 6, plural pairs of advancement guide rollers 53 each having a V-shaped groove formed in its outer circumferential surface are arranged on the cable bearer fixture 51 in vertically spaced relation such that each pair of advancement guide rollers 53 are positioned side by side at the same level with the V-shaped grooves opposed to each other. An advancement V-rail guide 54 which is vertically long and has opposite side edges each projecting in a V-shape engages the advancement guide rollers 53 to be held between the rollers 53 lying on both sides. The advancement V-rail guide 54 is therefore vertically movable while being guided by the advancement guide rollers 53. Further, the advancement V-rail guide 54 is joined through a plurality of vertically spaced connecting rods 56 to an advancement support plate 55 which is in the form of a vertically long plate projecting from the advancement base 33. In other words, the cable bearer fixture 51 is supported to be vertically movable relative to the advancement support plate 55 and hence the advancement base 33 through the advancement V-rail guide 54 and the advancement guide rollers 53. Then, when the advancement sprocket 48 is driven by the advancement motor unit 43, the cable bearer fixture 51 is vertically moved relative to the advancement base 33, whereupon the cable bearer 50 is let out downward or withdrawn upward along the advancement guide 52.

Additionally, as shown in FIG. 2, the advancement guide 52 has a lower end portion 52a sloped so that the cable bearer 50 is let out along the slope in one direction. Further, as described later (in connection with FIGS. 15 to 18), the lower end portion 52a of the advancement guide 52 has a distal end 52b which is pivotable through a hinge 52c and changeable in angle of inclination thereof. The cleaning means 14 is coupled to the cable bearer 50 capable of being let out in such a way.

In the construction described above with reference to FIGS. 2 to 6, the lifting motor unit 36 mounted on the lifting base 30 drives the lifting sprocket 41 for rotation through the worm wheel 40. Then, the advancement base 33 joined to the lifting V-rail guide 32 through the connecting rods 34 is moved up and down while being guided by the lifting guide rollers 31. Likewise, the advancement motor unit 43 drives the advancement sprocket 48 for rotation through the worm wheel 47. Then, the advancement guide rollers 53 and the cable bearer fixture 51 are moved up and down while being guided by the advancement guide 52, enabling the cable bearer 50 to be let out and withdrawn.

The operation of advancing the cleaning means through the cooperation of the developing mechanism 14, the lifting mechanism 16 and the transfer mechanism 17 will now be described with reference to FIGS. 7 to 10, in which FIGS. 7A, 8A, 9A and 10A show a state as viewed from the side and FIGS. 7B, 8B, 9B and 10B show a state as viewed from the above.

Figure 7A:
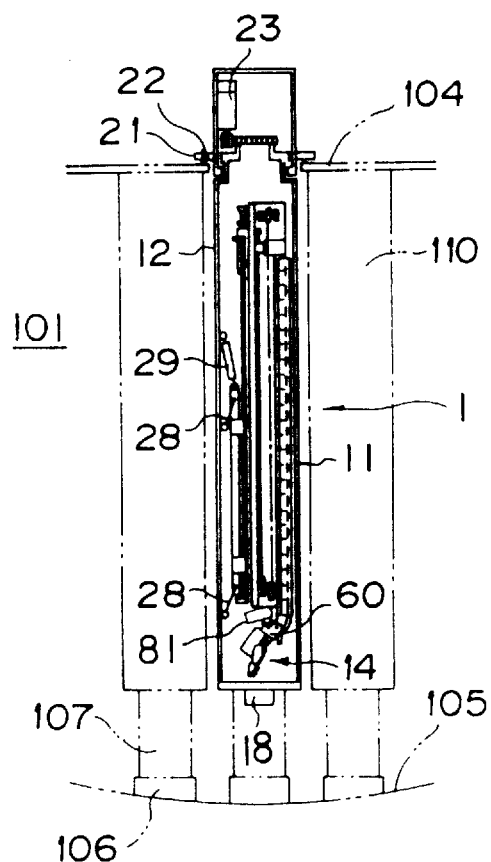
FIG. 7A is a side cross-sectional view showing an initial installed state of the apparatus and FIG. 7B is a plan view showing an arrangement of the cleaning means in the initial installed state.
Figure 7B:
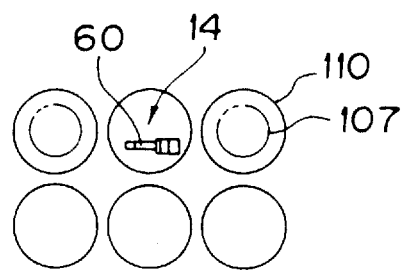

FIGS. 7A and 7B show a state immediately after the reactor bottom cleaning/working apparatus 1 has been installed in the reactor pressure vessel 101. Specifically, the reactor bottom cleaning/working apparatus 1 is mounted on the control rod driving mechanism housing 107, and the turning motor 23 is energized to rotate the body case 12 to determine the direction of the opening 11 in the body case 12, i.e., the direction in which the cleaning means 14 is to be advanced. In this embodiment, the opening 11 is directed to the right as viewed on the drawings and the cleaning means 14 is advanced to the left. Note that, in the illustrated state, the cleaning means 14 is held inside the body case 12 as shown in FIG. 7A and is positioned away from the center of a gap area defined by a plurality of surrounding control rod driving mechanism housings 107 as shown in FIG. 7B.

Figure 8A:
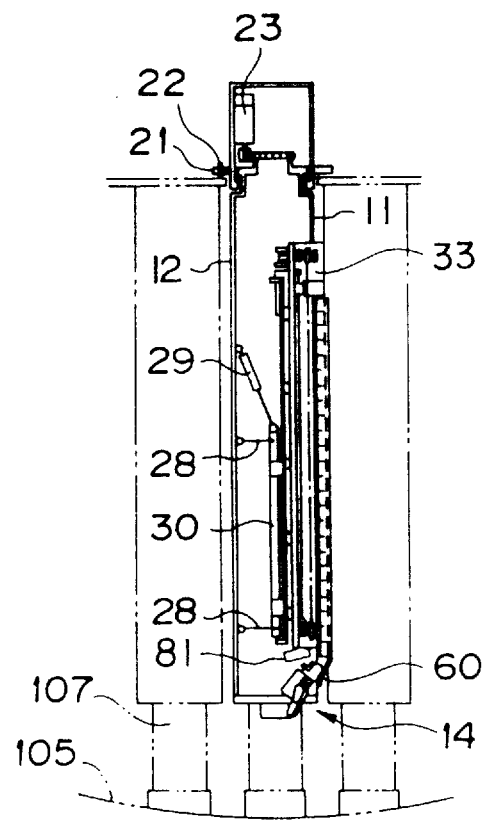
FIG. 8A is a side cross-sectional view showing a developed state of the apparatus and FIG. 8B is a plan view showing an arrangement of the cleaning means in the developed state.
Figure 8B:
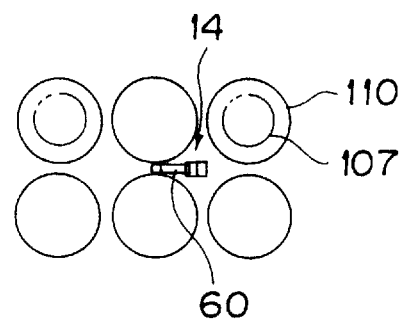

Then, as shown in FIGS. 8A and 8B, the air cylinders 29 are actuated to turn the developing links 28 down, thereby developing the lifting base 30, the advancement base 33, etc. rightward of the body case 12. At this time, the cleaning means 14 is placed nearly at the center of the gap area defined by the surrounding control rod driving mechanism housings 107. Since the developing links 28 are lowered as they are turned down, the lifting base 30 and the advancement base 33 are descended from their retracted positions and, at the same time, projected out through the opening 11 of the body case 12. This means that the vertical stroke to be covered by the lifting base 30 is partly provided by the turning of the developing links 28 and, correspondingly, the space which is occupied by the internal mechanisms of the working apparatus is reduced, resulting in smaller weight of the working apparatus. Further, the use of the developing links 28 can provide a large development stroke with a simple structure.

Figure 9A:
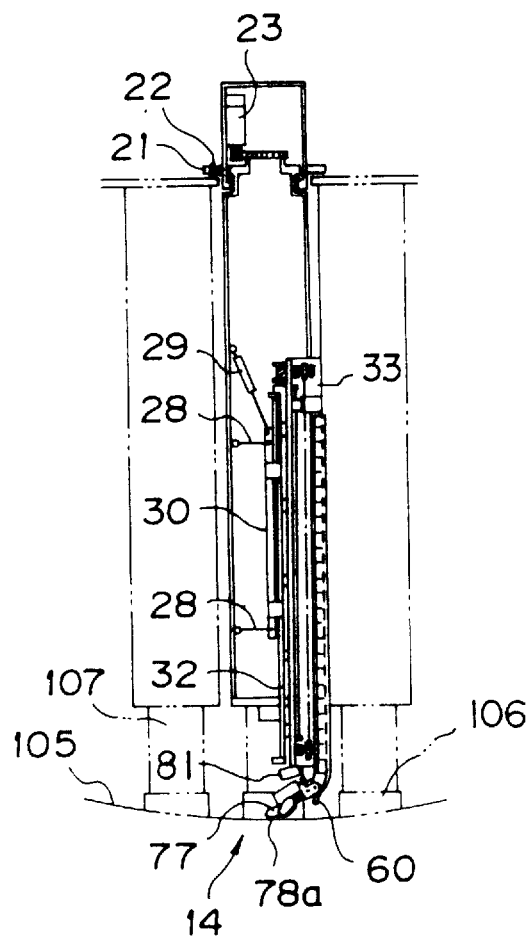
FIG. 9A is a side cross-sectional view showing a descended state of the cleaning means and FIG. 9B is a plan view showing an arrangement of the cleaning means in the descended state.
Figure 9B:
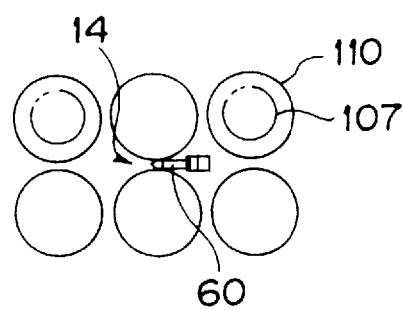

Next, as shown in FIGS. 9A and 9B, the advancement base 33 is descended relative to the lifting base 30 until the cleaning means 14 disposed at the lower end of the cable bearer 50 reaches the foot mirror 105. As described later, the cleaning means 14 includes a tip oscillating mechanism and a suction nozzle. The tip oscillating mechanism is vertically rotatable at a portion to which the suction nozzle is supported and at its root portion. Therefore, when the cleaning means 14 is rested on the foot mirror 105, the tip oscillating mechanism is vertically rotated at both the portions in a passive manner so that the suction nozzle follows the slope of the foot mirror. The operation of descending the advancement base 33 is stopped by detecting a position to which the root portion is rotated.

Figure 10A:
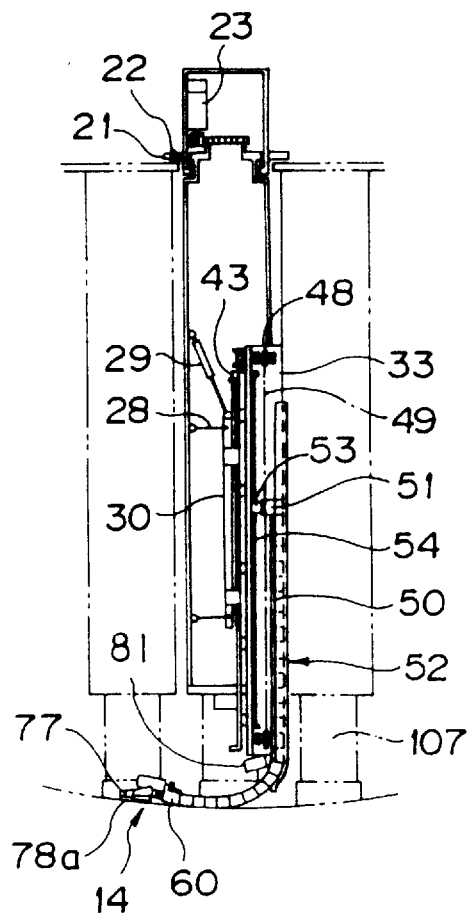
FIG. 10A is a side cross-sectional view showing a cleaning state of the apparatus and FIG. 10B is a plan view showing an arrangement of the cleaning means in the cleaning state.
Figure 10B:
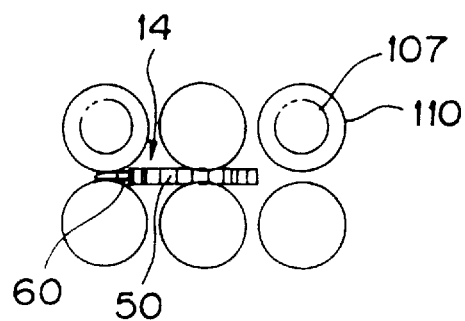

Finally, as shown in FIGS. 10A and 10B, the advancement motor unit 43 is energized to rotate the advancement sprocket 48, whereupon the cable bearer fixture 51 is descended relative to the advancement base 33 and the cable bearer 50 is advanced along the advancement guide 52. At a distal end of the cable bearer 50, as described later, the tip oscillating mechanism including a brush is provided along with the suction nozzle so that it is advanced on the foot mirror 105 with the cable bearer 50 into a gap area between the stub tubes 106. The brush is moved to wipe over the foot mirror while peeling off clads and foreign matters, and these peeled-off clads and foreign matters are sucked through the suction nozzle for recovery. After the completion of the cleaning and recovering work, the reactor bottom cleaning/working apparatus is withdrawn and pulled up into the retracted state through steps which are a reversal to the above steps.

The developed position of the developing mechanism will now be described in more detail. FIG. 3 shows the state where the developing mechanism is developed at the reactor bottom. As shown in FIG. 3, with the developing links 28 turned down, the lifting base 30 and the advancement base 33 are developed outward of the body case 12, and the cable bearer 50, the suction hose 5 and the cable 6 are moved to the center of a gap area defined by a plurality of surrounding control rod guide tubes 110. In this embodiment, since the developing mechanism is developed upwardly rightward in FIG. 3, there occurs no interference with the surrounding control rod guide tubes 110. Furthermore, the advancement base 33 and the lifting V-rail guide 32 are descended after the development of the developing mechanism, but those members are also kept from interfering with both the control rod driving mechanism housing 107, to which the base body 12 is attached, and the surrounding stub tubes 106.

Figure 11:
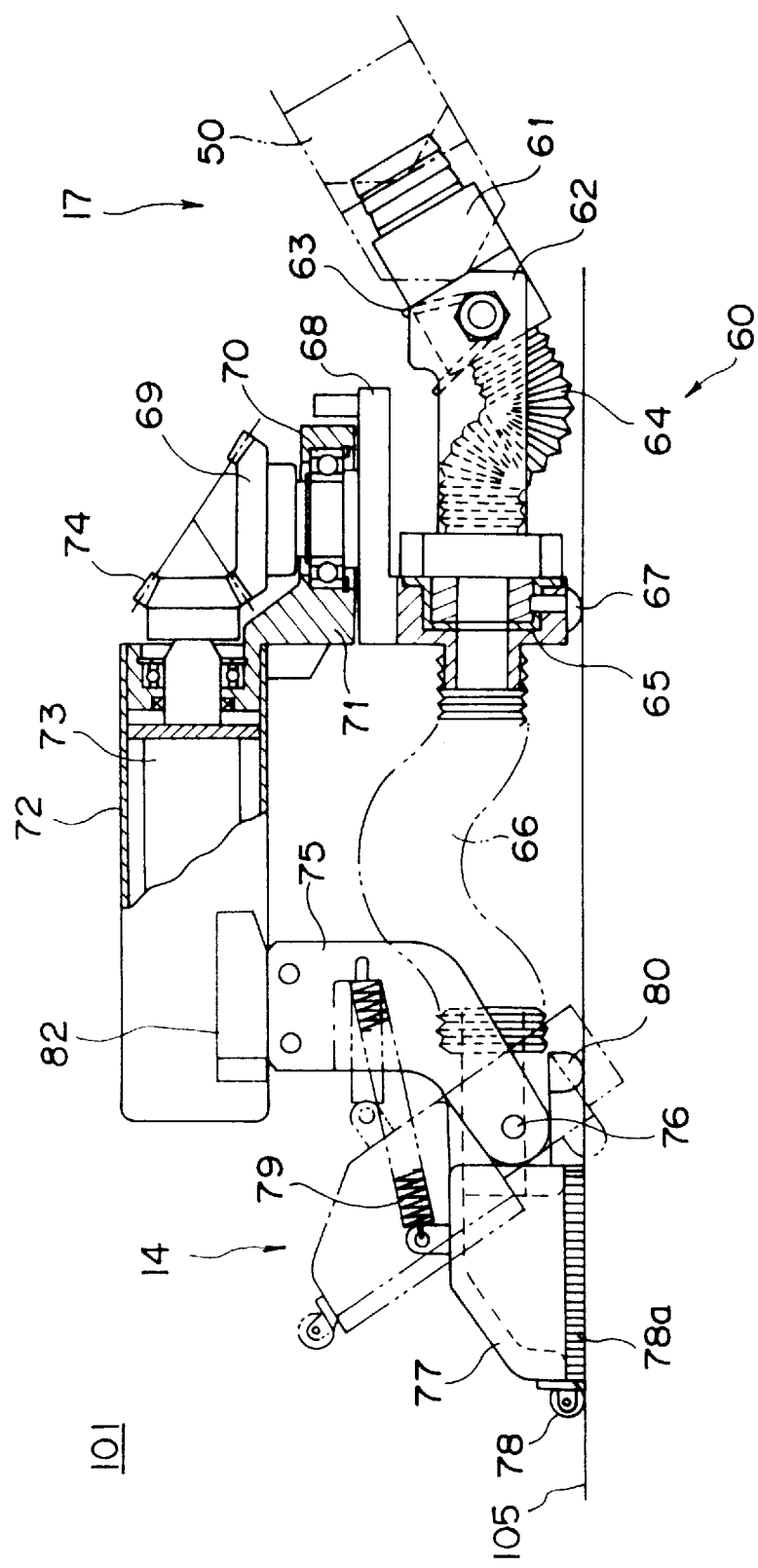
FIG. 11 is a view showing a construction of the cleaning means in the first embodiment.

The construction of the cleaning means 14 will now be described in detail with reference to FIG. 11. FIG. 11 is a front view, partly cross-sectioned, showing the construction of the cleaning means 14.

In this embodiment, the transfer mechanism 17 for transferring the cleaning means 14 comprises the cable bearer 50 in the form of a linear guide member which holds the cleaning means 14 at its distal end, is extended downward from the lifting mechanism 16, and is bendable only in one direction, and a tip oscillating mechanism 60 which is provided at the distal end of the cable bearer 50 and has a degree of freedom for actively moving the cleaning means 14 on a horizontal plane, a degree of freedom for moving the cleaning means 14 in the vertical direction, and a degree of freedom for rotating the cleaning means 14 about an axis in a direction in which the cleaning means 14 is to be transferred. The transfer mechanism 17 is thus constructed so that the cleaning means 14 is movable into the gap area between the stub tubes 106 while following the curvature of the foot mirror 105 of the reactor pressure vessel 101. The tip oscillating mechanism 60 provided at the distal end of the cable bearer 50 in the form of a linear guide member, which is one component of the transfer mechanism 17 and bendable only in one direction, includes, as a driving source for moving the cleaning means on a horizontal plane, an electric-powered actuator provided by an oscillating motor described later.

More specifically, a hose joint 61 is fixed to the distal end of the cable bearer 50 and a bracket 62 is supported by the hose joint 61 in a vertically rotatable manner, the bracket 62 being pressed by a pressing spring 63 into its home position. A base side bellows hose 64 is connected to the bracket 62 and has a fore end to which a tip side bellows hose 66 is in turn connected rotatably through a swivel joint 65. A support boss 67 having a spherical end is provided at the bottom of the swivel joint 65. While the support boss 67 is kept in slide contact with the upper surface of the foot mirror 105, the swivel joint 65, etc. can turn according to the slope of the foot mirror 105 in a direction perpendicular to the direction in which the cable bearer 50 is advanced.

An oscillating base 68 is provided on the swivel joint 65 and includes a driven bevel gear 69 fixedly mounted thereon. A motor case 72 is connected to an outer race 71 of a bearing 70 supporting the driven bevel gear 69. An oscillating motor 73 as the aforesaid electric-powered actuator is water-tightly housed in the motor case 72. A drive bevel gear 74 is fitted over an output shaft of the oscillating motor 73. When the oscillating motor 73 is energized to rotate the drive bevel gear 74, the driven bevel gear 69 is also rotated and the tip side bellows hose 66, etc. can oscillate in the transverse direction to the left or right. Thus, the tip oscillating mechanism 60 is constructed as explained above.

A nozzle bracket 75 is joined to the underside of a front portion of the motor case 72 and a suction nozzle 77 is supported by the nozzle bracket 75 in a vertically rotatable manner through a pivotal hinge 76. The suction nozzle 77 is coupled to the tip side bellows hose 66. A brush 78*a* is provided on the underside of the suction nozzle 77 and a roller 78 is provided at a front end of the suction nozzle 77. The roller 78 serves to make the suction nozzle 77 more easily movable over the foot mirror 105 while keeping it in contact with the foot mirror.

The nozzle bracket 75 and the suction nozzle 77 are coupled to each other by a tension spring 79. Before the suction nozzle 77 comes into contact with the foot mirror 105, as indicated by imaginary lines in FIG. 11, the suction nozzle 77 is pulled up by the tension spring 79 toward motor case 72. When the suction nozzle 77 is crawled on a horizontal plane, it is turned to a horizontal posture by a reaction imposed from a support boss 80 so as to be able to follow the vertical slope of the foot mirror 105. The length of a suction flow path of the suction nozzle 77 is adjustable through the tip side bellows hose 66 even when it is changed upon oscillation in the transverse direction and angular movement in the vertical direction.

Additionally, a monitoring camera 81 is provided at a lower end of the advancement base 33 so that the condition of the suction nozzle 77 being advanced on the foot mirror 105 can be monitored from the side behind the suction nozzle 77. In order to monitor the sucking condition, a monitoring device 82 comprising a camera and a light assembled as an integral unit is disposed in a lower portion of the motor case 72. A description will now be made on how the cleaning means constructed as described above oscillates transversely on the foot mirror, with reference to FIGS. 12, 13 and 14.

Figure 12:
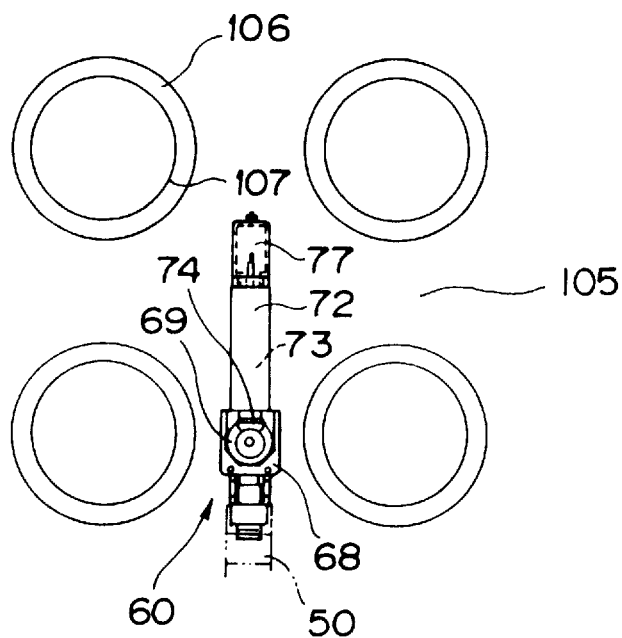
FIG. 12 is a plan view for explaining operation of the first embodiment, the view showing a state before the cleaning means starts oscillation.

First, as shown in FIG. 12, the tip oscillating mechanism 60 is advanced on the foot mirror 105 into a gap area between the control rod driving mechanism housings 107.

Figure 13:
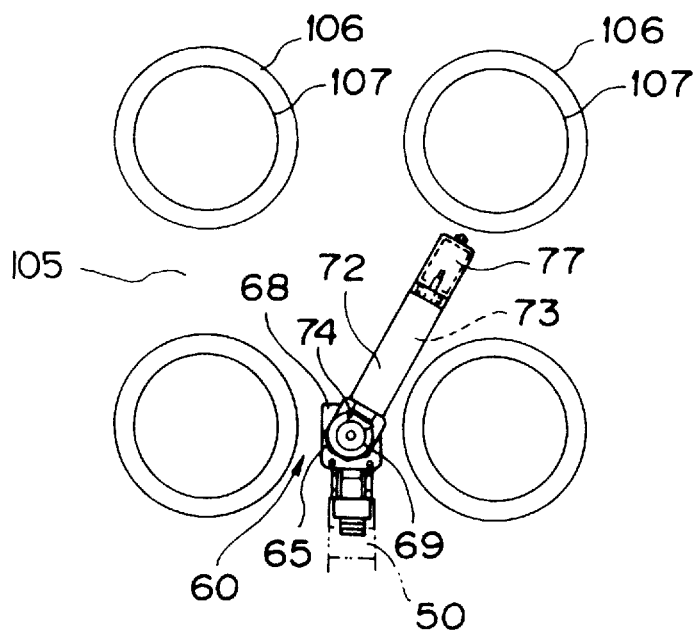
FIG. 13 is a plan view for explaining operation of the first embodiment, the view showing a state where the cleaning means is oscillated.

Then, as shown in FIG. 13, the oscillating motor 73 is energized to oscillate or swing the suction nozzle 77 through the bevel gears 74, 69 and the swivel joint 65.

Figure 14:
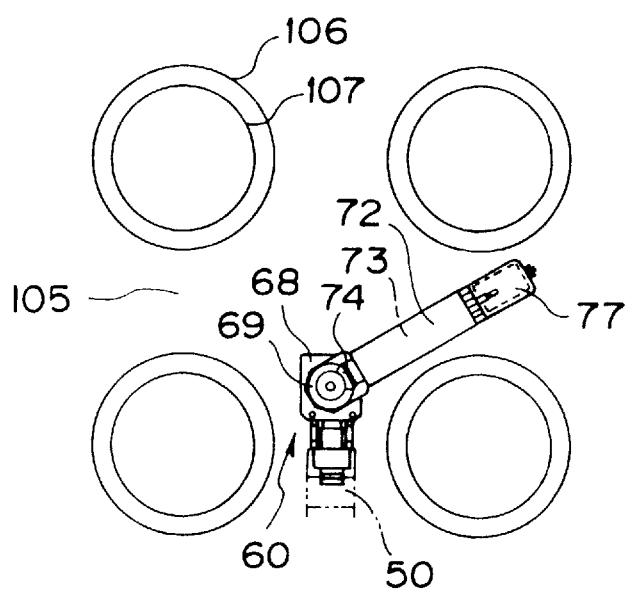
FIG. 14 is a plan view for explaining operation of the first embodiment, the view showing a state where the cleaning means is further oscillated.

Subsequently, as shown in FIG. 14, the suction nozzle 77 is further swung, while continuing to advance the cable bearer 50, to come deeper into the gap area. By oscillating the suction nozzle 77 on the foot mirror 105, the brush 78*a* is moved, while wiping over the upper surface of the foot mirror 105, to scrape and peel off clads lightly stuck thereon.

The foot mirror 105 is a part of a spherical surface and hence curved and sloped in two directions orthogonal to each other. The tip oscillating mechanism 60 including the suction nozzle 77 can follow the slope in the direction of the advance of the cable bearer 50 through both the degree of freedom for relative rotation between the hose joint 61 and the bracket 62 and the degree of freedom for rotation at the pivotal hinge 76, whereas it can follow the slope in the transverse direction through the support bosses 67, 80 and the swivel joint 65, as stated above.

A manner of making the suction nozzle 77 following the slope of the foot mirror 105 in the direction of the advance of the cable bearer 50 will now be described with reference to FIGS. 15 to 18. In these drawings, the bellows hose 66 is omitted.

Figure 15:
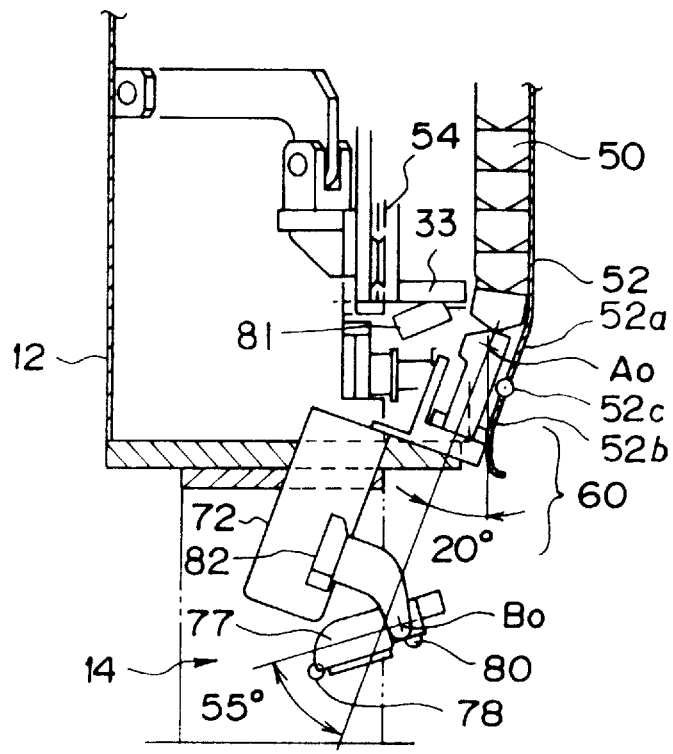
FIG. 15 is a side view for explaining operation of the first embodiment, the view showing how the cleaning means changes its operating angle.
Figure 16:
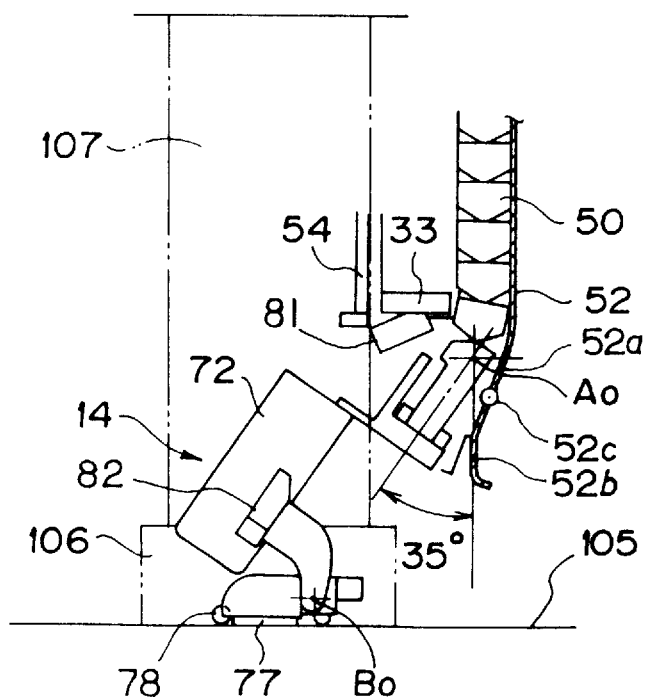
FIG. 16 is a side view for explaining operation of the first embodiment, the view showing how the cleaning means changes its operating angle.

FIG. 15 is a schematic view showing a state before the suction nozzle 77 is descended after the development of the developing mechanism, and FIG. 16 is a schematic view showing a state where the suction nozzle 77 is rested on a horizontal plane.

Prior to a descent of the suction nozzle 77, as shown in FIG. 15, the tip oscillating mechanism 60 is inclined at 20° for example, with respect to the distal end of the advancement guide 52. The suction nozzle 77 is further inclined at 55° with respect to the tip oscillating mechanism 60. Thus, a sucking surface is inclined at 75° with respect to the normal line. It is therefore required for the suction nozzle 77 to further incline through 15° in order that the sucking surface lies in agreement with a horizontal plane. Specifically, when the suction nozzle 77 is descended in the state of FIG. 15, the roller 78 first contacts the foot mirror 105 and, with a continued descent, the suction nozzle 77 is then rotated upward through 15° about points indicated by Ao and Bo in the drawing, causing the sucking surface to lie horizontally, as shown in FIG. 16.

It is estimated that a vertical slope angle to which the suction nozzle 77 must follow when landing on the foot mirror 105 is about 45° at maximum in a direction inclining downward at its fore end when the apparatus is mounted on the outermost control rod driving mechanism housing 107 and the cable bearer 50 is advanced toward the center of the foot mirror, and is about 45° at maximum in a direction inclining upward at its front end when the apparatus is mounted on the outermost control rod driving mechanism housing 107 and the cable bearer 50 is advanced toward the outer periphery of the foot mirror.

Figure 17:
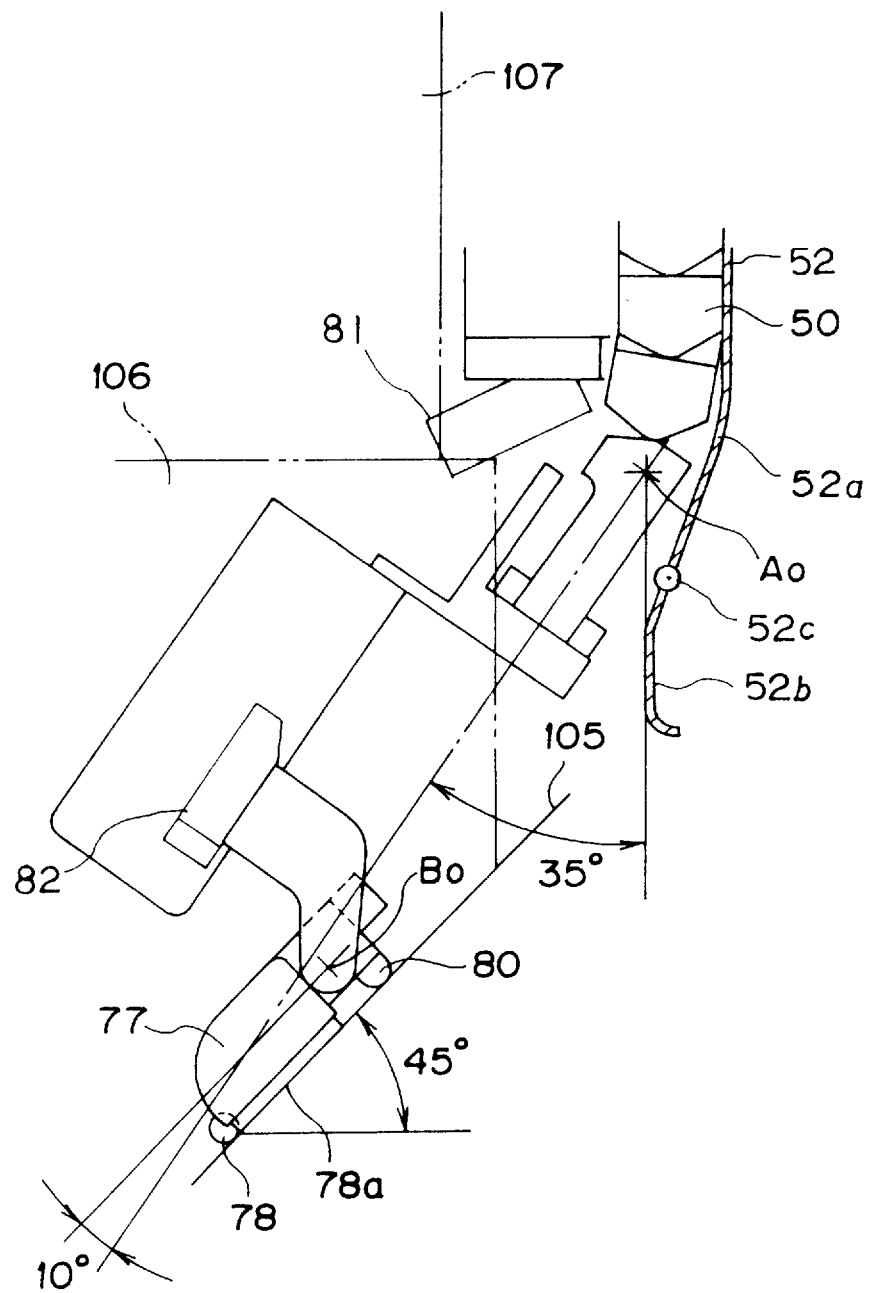
FIG. 17 is a side view for explaining operation of the first embodiment, the view showing how the cleaning means changes its operating angle.

FIG. 17 is a schematic view showing a state where the suction nozzle 77 is advanced in a posture inclining downward at 45°. In this case, since the support boss 80 contacts the foot mirror 105 prior to the roller 78 at the fore end of the suction nozzle 77, the suction nozzle 77 is turned backward through 45° about the pivot point Bo from the initial state of 55° to a final state of 15° whereas the tip oscillating mechanism 60 is turned forward through 15° about the pivot point Ao to a final state of 35°. Thus, the suction nozzle 77 is inclined at 45° in total, allowing the sucking surface to follow the foot mirror.

Figure 18:
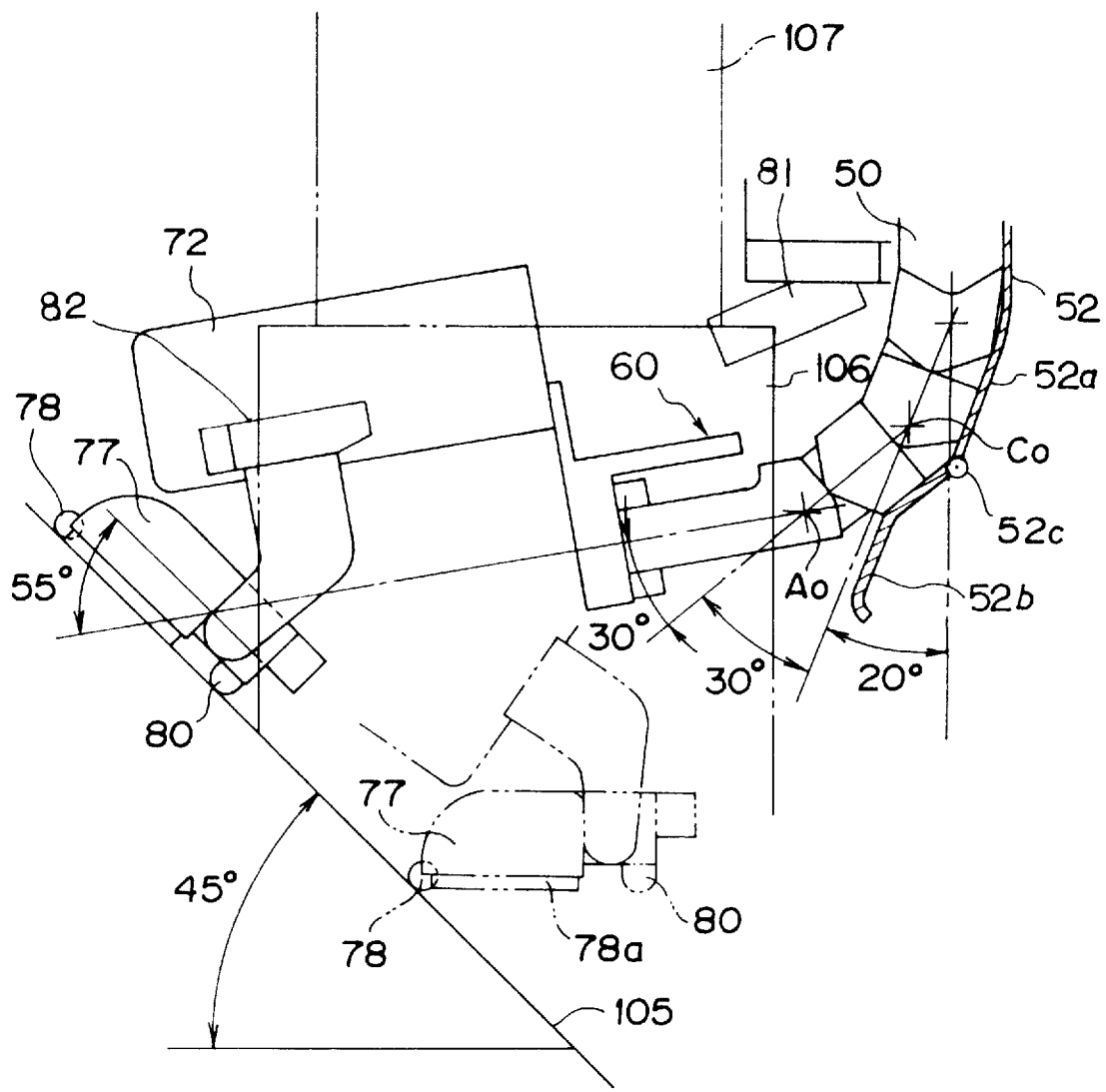
FIG. 18 is a side view for explaining operation of the first embodiment, the view showing how the cleaning means changes its operating angle.

FIG. 18 is a schematic view showing a state where the suction nozzle 77 is advanced in a posture inclining upward at 45°. In this case, when the suction nozzle 77 is descended, the roller 78 first contacts the foot mirror 105 as with the case of landing on a horizontal plane. Here, it occurs that when the advancement base 33 is descended and the roller 78 contacts the foot mirror 105, the normal line to the foot mirror 105 at the contact point of the roller 78 passes below the pivot point Ao and the moment due to reaction force acts on the suction nozzle 77 to turn it counterclockwise about the pivot point Ao as viewed in the drawing. Therefore, upon contacting the foot mirror 105, the suction nozzle 77 is not moved upward along the slope of the foot mirror 105, but moved downward, contrary to the intention. To avoid such an event, the distal (lower) end 52*b* of the advancement guide 52 is rotatably supported by the hinge 52*c*, and the tip oscillating mechanism 60 is turned upward by actuating an air cylinder (not shown). According to such arrangement, when the advancement base 33 is descended, the suction nozzle 77 can always reach the foot mirror 105 such that the normal line to the foot mirror 105 at the contact point of the roller 78 passes above the pivot point Ao. Then, by advancing the cable bearer 50, the suction nozzle 77 is moved upward along the upper surface of the foot mirror 105 while the roller 78 is kept in contact with the foot mirror 105. In this state, the distal end 52b of the advancement guide 52 is turned through 30° about a point Co and the tip oscillating mechanism 60 is turned through 30° about the point Ao. Since the suction nozzle 77 is inclined at 55° and the tip oscillating mechanism 60 is inclined at 20° in the initial state, the suction nozzle 77 is inclined at 135° in total from the vertical direction, thus allowing the sucking surface to follow the upper surface of the foot mirror 105 inclining upward at 45°. In this respect, the point where the roller 78 first contacts the foot mirror 105 is located on the side near the cable bearer 50 with respect to the center of the body case 12.

In any case, since the suction nozzle 77 is initially positioned on the side near the cable bearer 50 with respect to the center of the body case 12 as described above, it is possible to clean the surroundings of the stub tube 106 to the top of which the body case 12 is mounted, by starting to suck and recover clads from such a position with oscillation of the tip oscillating mechanism 60.

The above operating process can be precisely and promptly performed under surveillance of the advance condition of the suction nozzle by using the monitoring camera 81.

Figure 19:
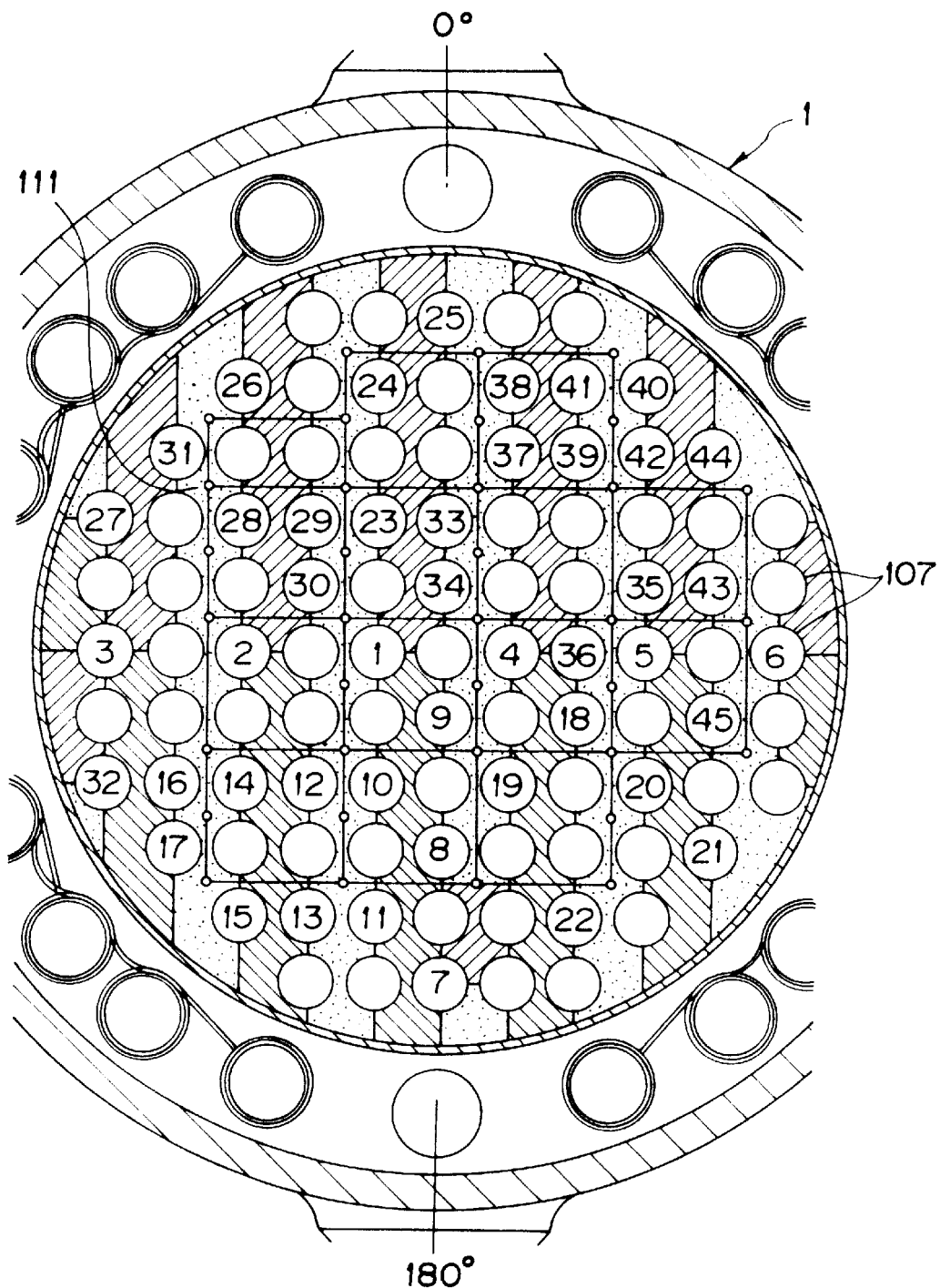
FIG. 19 is a side view for explaining operation of the first embodiment, the view showing a sequence of cleaning.

A description will now made on an installed position of the body case 12 and a cleaning area on the foot mirror 105 with reference to FIG. 19. FIG. 19 shows one example of the relationship between an installed position of the body case 12 and a cleaning area on the foot mirror 105.

Although the working apparatus has been described as developing the cleaning means 14 leftward rearward and then advancing it forward from there in the illustrated embodiment, another apparatus capable of developing the cleaning means rightward rearward and then advancing it forward from there in mirror symmetric relation to the illustrated embodiment is also prepared in work for an actual plant. Thus, two working apparatus are employed in actual work.

In FIG. 19, portions indicated by lines slanting upward to the right represent areas cleaned by installing the working apparatus, which is capable of developing the cleaning means rightward rearward and then advancing it forward from there, in each of setting positions 1–6 and 7 and advancing the suction nozzle 77 in the direction of 0° until the outermost periphery of the foot mirror.

Further, portions indicated by lines slanting upward to the left represent areas cleaned by installing the working apparatus, which is capable of developing the cleaning means leftward rearward and then advancing it forward from there, in each of the setting positions 1–6 and advancing the suction nozzle 77 in the direction of 180° until the outermost periphery of the foot mirror.

Still further, portions indicated by dots represent areas cleaned by installing one of the working apparatus, which is capable of developing the cleaning means rightward rearward or leftward rearward, and advancing the suction nozzle 77 in the direction of 90° or 270°.

In the example shown in FIG. 19, it is estimated that it is possible to clean about 50% of the upper surface of the foot mirror surrounded by a shroud support leg by installing the apparatus six times, about 80% thereof by installing the apparatus twenty-two times, and about 100% thereof by installing the apparatus 45 times.

Since in-core monitoring housings 111 penetrate through the foot mirror 105 for every two rows of the control rod driving mechanism housings 107 as shown in FIG. 19, the installed position of the working apparatus must be changed to clean the surroundings of the in-core monitoring housings 111.

With the thus-constructed apparatus for cleaning at the reactor bottom according to this embodiment, clads and foreign matters can be automatically sucked and recovered under remote control by advancing all over the upper surface of the foot mirror 105 surrounded by a shroud support leg.

Since such a process can be performed while visually confirming the sucking condition with the monitoring device 82 comprising a camera and a light assembled as an integral unit, it is possible to correctly judge the start, shift and end of sucking work and hence implement the work with reliability.

Further, when clads and foreign matters are to be cleaned and recovered from the upper surface of the foot mirror 105 of the nuclear pressure vessel to which the suction nozzle cannot be accessed without removing the control rod guide tubes, the number of control rod guide tubes which must be removed for cleaning work can be reduced and the cleaning work can be implemented by installing the working apparatus a reduced number of times. In other words, since the cleaning and recovering work can be easily performed in a shorter time, the working efficiency can be improved and the working term can be cut down, which is also effective in reducing the exposure rate.

It should be understood that, other than the foregoing embodiment, the present invention can also be practiced in various modifications and applications.

For example, while the brush of the cleaning means is fixed to the suction nozzle in the foregoing embodiment, the brush may be rotatably attached to the suction nozzle.

In contrast with the foregoing embodiment wherein the brush cannot wipe over the upper surface of the foot mirror unless the suction nozzle is moved, such a modification enables the brush to rotate and wipe over the upper surface of the foot mirror even with the suction nozzle kept at a standstill, thereby increasing an ability of peeling off clads. As a result, it is possible to improve the efficiency of recovering clads and contribute to reducing the air dose outside the reactor.

A rotatable wire brush or grinder may also be provided in addition to the rotatable brush. With this modification, the upper surface of the foot mirror can be ground by rotating the wire brush or grinder. As a result, those clads which are ionized and taken into the metal matrix and firmly bonded there, for example, can also be peeled off and an ability of recovering clads can be further increased.

In the foregoing embodiment, the tip oscillating mechanism for the cleaning means is oscillated by the motor provided near the sucking portion. However, the tip oscillating mechanism may be oscillated by a wire operated by a driving source provided in a position remote from the cleaning means.

Such an arrangement is advantageous in that the structure of the cleaning means is simplified because of the driving source being separated from the sucking portion, clads are prevented from entering the driving source, and reliability can be improved.

Further, the tip oscillating mechanism constituting the transfer mechanism may be a heating control mechanism in combination with a shape memory metal, which serves as a driving source for moving the cleaning means on a horizontal plane. Specifically, in this modification, a shape memory alloy in the form of a spring is disposed near the center of oscillating motion and then alternately subjected to heating and cooling (dissipation of heat). By utilizing displacement forces produced upon the shape memory alloy deforming with heat, the cleaning means is oscillated.

With such an arrangement, the driving portion can be simplified and reliability can be improved.

Further, the tip oscillating mechanism for the cleaning means may be modified such that the suction nozzle and the nozzle are moved by a multi-articulated arm provided at the distal end of the cable bearer.

Such an arrangement make it possible to give the suction nozzle a degree of active freedom, realize more complicated movement and operation of the suction nozzle, and further improve an ability of accessing to any desired position.

Figure 20:
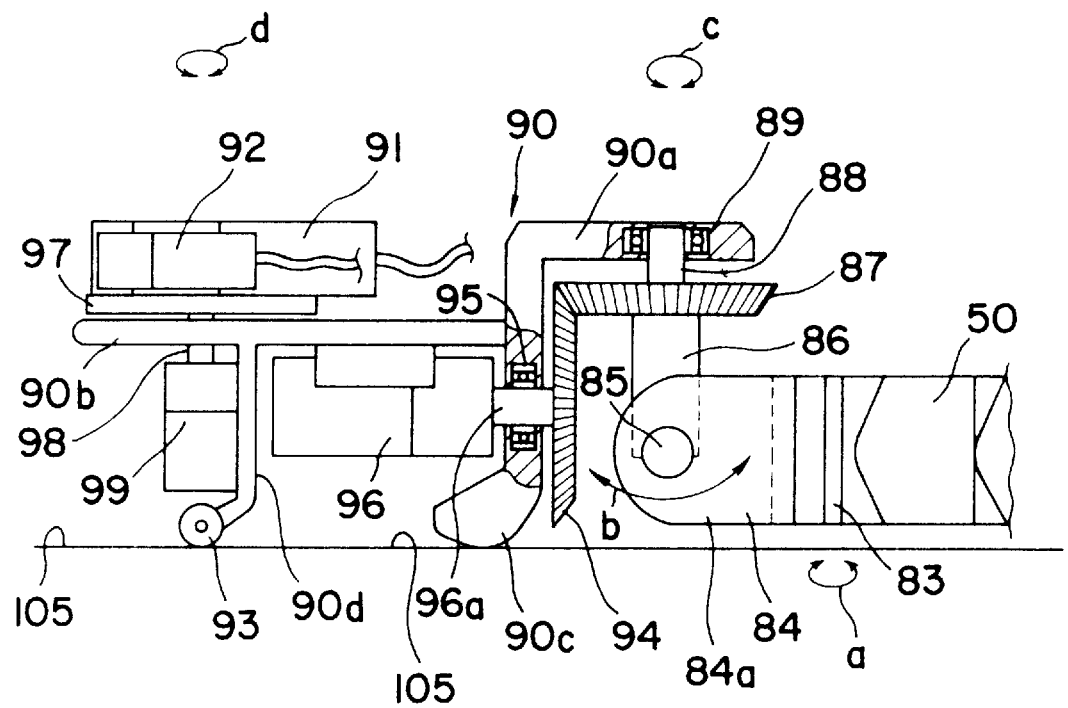
FIG. 20 is a side view showing a construction of principal part of a second embodiment of the apparatus for carrying out workings at the reactor bottom according to the present invention.
Figure 21:
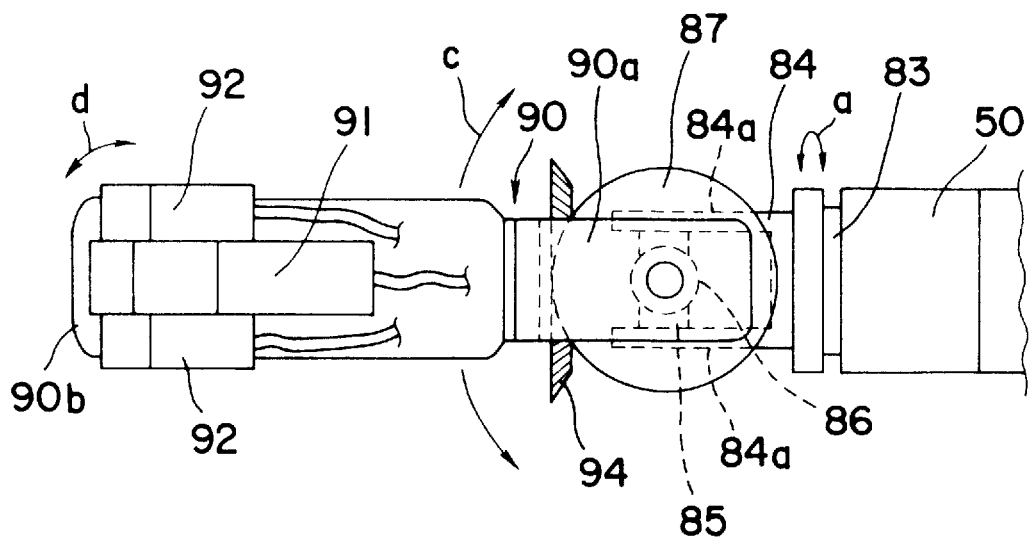
FIG. 21 is a plan view of FIG. 20.

Second Embodiment (FIGS. 20 and 21)

FIG. 20 is a side view showing a construction of principal part of a second embodiment of the apparatus for carrying out workings at the reactor bottom according to the present invention, and FIG. 21 is a plan view of FIG. 20.

This embodiment is concerned with a visual inspecting/-working device at the reactor bottom, and intends to inspect weld joints, etc. by using a video television device (hereinafter referred to as a VT device) as inspecting means.

The visual inspecting/working device for use in this embodiment is constructed as a unit attached to the distal end of the cable bearer 50 in the above first embodiment instead of the tip oscillating mechanism 60. FIGS. 20 and 21 show only the distal end of the cable bearer 50 and the structure of the unit in an enlarged scale, and the remaining components will not be described below.

As shown in FIGS. 20 and 21, a bracket 84 is attached to the distal end of the cable bearer 50 through a rotary joint 83 so that the bracket 84 is rotatable about an axis aligned with the axis of the cable bearer 50 (in a direction indicated by arrow a). The bracket 84 has a pair of walls 84a, 84a projecting from the distal end of the cable bearer 50 and facing each other in parallel. A columnar support member 86 is supported between both the walls 84a, 84a through a shaft 85 to be rotatable (in a direction indicated by arrow b) to assume a vertical position and an inclined position.

A bevel gear 87 and a support shaft 88 are integrally provided at a revolving (upper) end of the support member 86 in coaxial relation to the support member 86.

In this embodiment, a frame 90 is rotatably supported by the support shaft 88 through a bearing 89. A VT camera 91 and a VT light 92 are mounted on the frame 90.

As shown in FIG. 20, the frame 90 comprises a portion 90a bent into the form of inverted L as viewed from the side, and a portion 90b extending long horizontally from the portion 90a. Legs 90c, 90d are extended downward respectively from the portions 90a, 90b. A roller 93 is attached to a lower end of one leg 90d, allowing the frame 90 to roll over the foot mirror 105. Incidentally, the other leg 90c slides over the foot mirror 105 while directly contacting it.

The L-shaped portion 90a of the frame 90 supports, through a bearing 95, the other bevel gear 94 which is meshed with the bevel gear 87 fixed to the support shaft 84 for rotation therewith. The other bevel gear 94 is driven by an oscillating motor 96 for rotation. Specifically, when the other bevel gear 94 is rotated through the meshing with the one bevel gear 87 kept fixed about its axis, the frame 90 is rotated in its entirety about the shaft 88 of the support member 86 supported by the bracket 84 in the circumferential direction (indicated by arrow c).

The VT camera 91 and the VT light 92 are mounted on the frame 90 through a support plate 97 which is coupled to a turning motor 99 through a shaft 98. Therefore, the VT camera 91 and a VT light 92 are themselves rotatable on the frame 90 by the turning motor 99 about the shaft 98 (in a direction indicated by arrow d).

According to the thus-constructed apparatus for carrying out workings at the reactor bottom of the second embodiment, as with the above first embodiment, the visual inspecting/working device can be advanced onto and over the foot mirror 105 upon downward movement of the cable bearer 50. Since the frame 90 is supported with respect to the cable bearer 50 through two shafts orthogonal to each other, i.e., the rotary joint 83 and the shaft 88 of the bracket 84, the visual inspecting/working device can move during operation while the legs 90c, 90d are following the spherical upper surface of the foot mirror 105.

Further, by energizing the oscillating motor 96 to rotate a third shaft 96a and turn the frame 90 through the meshing between both the bevel gears 87, 94, the frame 90 can be oscillated on the foot mirror 105 in any desired direction.

Still further, by energizing the turning motor 99 to rotate the support plate 97, the VT camera 91 and a VT light 92 can be turned to face in any desired direction.

According to this embodiment, therefore, in contrast with the prior art wherein a number of control rod guide tubes must be removed for visually inspecting and confirming weld joints on the foot mirror 105 or between the foot mirror 105 and the stub tubes 106, weld joints between the stub tubes 106 and the control rod driving mechanism housings 107, etc., it is possible to reduce the amount of such work, diminish the number of control rod guide tubes to be removed, and perform visual inspection over a wide area while reducing the number of times that the apparatus is installed. As a result, the working efficiency can be improved and the working term can be cut down.

Third Embodiment (FIGS. 22 to 28)

Figure 22:
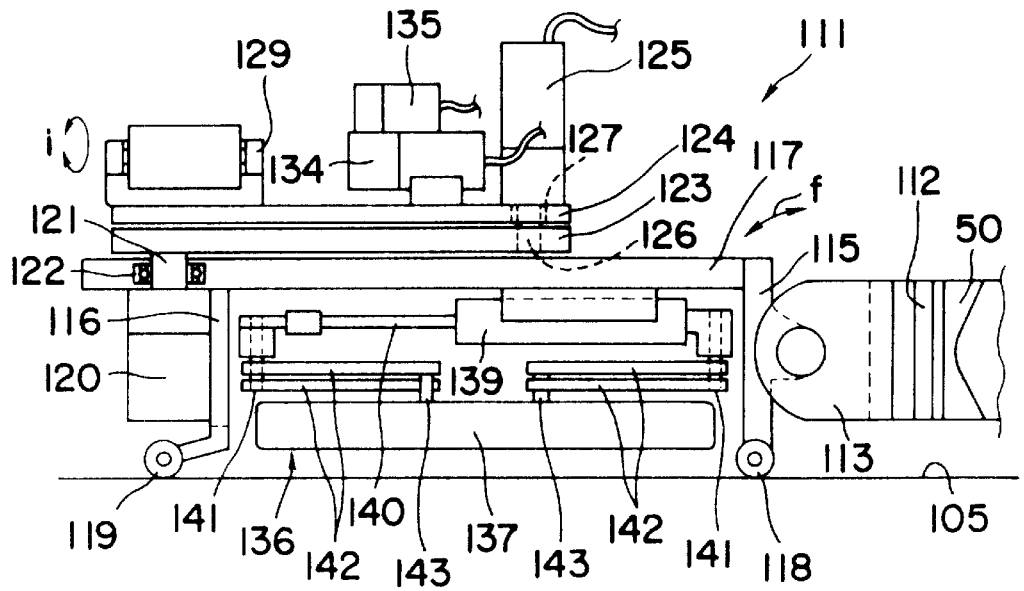
FIG. 22 is a side view showing a construction of principal part of a third embodiment of the apparatus for carrying out workings at the reactor bottom according to the present invention.
Figure 23:
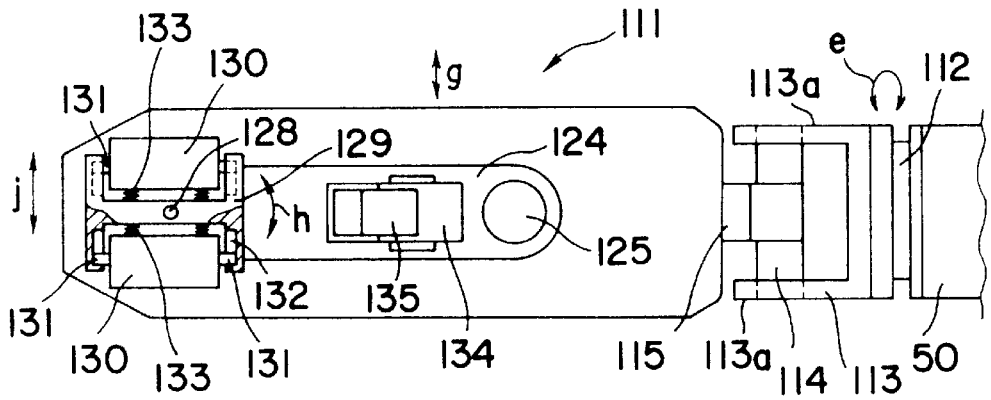
FIG. 23 is a plan view of FIG. 22.
Figure 24:
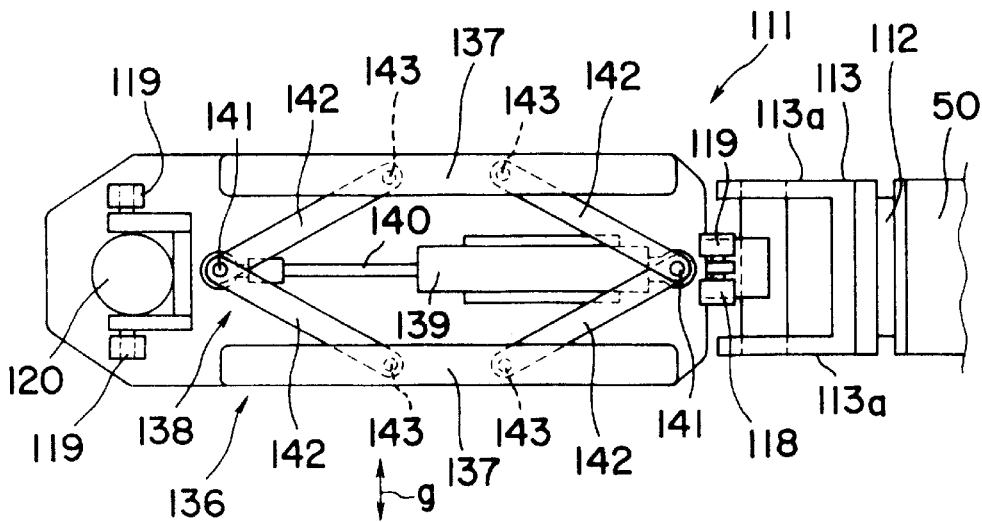
FIG. 24 is a bottom view of FIG. 22.

FIG. 22 is a side view showing a construction of principal part of a third embodiment of the apparatus for carrying out work at the reactor bottom according to the present invention. FIGS. 23 and 24 are respectively a plan and a bottom view of FIG. 22, and FIGS. 25 to 28 are views for explaining operation of the third embodiment in successive steps.

This embodiment is concerned with a nondestructive inspecting/working device at the reactor bottom, and intends to inspect weld joints, etc. by using a ultrasonic tracing (UT) or flaw detecting device 111 as the inspecting means.

As with the above second embodiment, the ultrasonic flaw detecting device for use in this embodiment is constructed as a unit attached to the distal end of the cable bearer 50. FIGS. 22 to 28 show only the distal end of the cable bearer 50 and the structure of the unit, and the remaining components will not be described below.

As shown in FIGS. 22 to 24, a bracket 113 is attached to the distal end of the cable bearer 50 through a rotary joint 112 so that the bracket 113 is rotatable about an axis aligned with the axis of the cable bearer 50 (in a direction indicated by arrow e), and also has a pair of walls 113a facing each other in parallel similarly to the above second embodiment.

A vertically long support member 115 is supported to be rotatable in a vertical plane (in a direction indicated by arrow f) between both the walls 113a through a horizontal shaft 114. A base body 117 is supported by the support member 115 and another support member 116 arranged in spaced relation from the support member 115, both of which serve as legs. The base body 117 can move over the foot mirror 105 by wheels 118, 119 attached to lower ends of the support members 115, 116.

A first drive motor 120 is disposed under a front end of the base body 117 and has an upward extending output shaft 121 which is supported by a bearing 122 provided in the base body 117 and projected upward from there. A projected end of the output shaft 121 is integrally rotatably coupled to one (left) end of a first arm 123 arranged on the base body 117 in parallel relation. The other (right) end of the first arm 123 is left free. Therefore, when the first drive motor 120 is energized to rotate the output shaft 121, the other end of the first arm 123 is turned above the base body 117 with rotation of the output shaft 121.

A second arm 124 is arranged on the first arm 123 in parallel relation, and a casing of a second drive motor 125 is fixed to an upper surface of the second arm 124. The second drive motor 125 has a downward extending rotary shaft 126 which is integrally rotatably coupled to the other (right) end of the first arm 123 after penetrating a hole 127 in the second arm 124. One (left) end of the second arm 124 is left free, and the other (right) end thereof is fixed to the casing of the second drive motor 125. With this arrangement, when the second drive motor 125 is energized to rotate the rotary shaft 126, one (left) end of the second arm 124 is turned about the other (right) end thereof.

Accordingly, by energizing the first and second drive motors 120, 125, both the arms 123, 124 are not only developed or stretched out transversely (in a direction indicated by arrow g in FIG. 23), but also contracted for return to their original positions.

On an upper surface of the second arm 124 on the side near one (left) end thereof, a probe holder 129 in the form of a pedestal is supported through a vertical pin 128 to be rotatable (in a direction indicated by arrow h) and is held in a neutral position shown in FIG. 23 by a spiral spring (not shown). A pair of left and right ultrasonic probes 130 are mounted on the probe holder 129. The ultrasonic probes 130 are each in the form of a nearly parallel pipe shape, for example, and arranged parallel to each other. Pins 131 projecting from opposite ends of each ultrasonic probe 130 are inserted into parallel guide grooves 132 formed in longitudinally opposing portions of the probe holder 129, so that the ultrasonic probe 130 can rotate about the pins 131 (in a direction indicated by arrow i) and slide transversely of the base body 117 (in a direction indicated by arrow j) within the range defined by the guide grooves 132. Further, the ultrasonic probes 130 are urged by springs 133 in directions away from each other.

Therefore, when the ultrasonic probes 130 are brought into contact with a traced surface, for which a flaw detection is to be made as described later, under a certain pressure, they can move three-dimensionally through backward translation against the springs 133 and rotation about both the pins 128, 131 arranged as two orthogonal axes, allowing probe elements to always take a posture perpendicular to the traced surface.

Further, a monitoring camera 134 and a light 135 are mounted on the second arm 124 in such a manner as able to change directions in which they face. This enables the work condition (the condition of flaw detecting work in this embodiment) to be monitored.

In addition, the base body 117 includes positioning means 136 for setting a traced position prior to starting the flaw detection. The positioning means 136 comprises a pair of left and right positioning members 137 arranged on the underside of the base body 117 and being able to project and retract from with respect to lateral faces of the base body 117, and a driving mechanism 138 for the positioning members 137. The positioning members 137 are each in the form of a bar and arranged parallel to the base body 117. The driving mechanism 118 comprises an air cylinder 139 and a cylinder rod 140 both serving as a driving source, and a pair of front and rear link arms 142 joined at one ends to a base end of the air cylinder 139 and a fore end of the cylinder rod 140 through pins 141 to be able to freely open and close. The other ends of the link arms 142 are coupled to the positioning members 137 through pins 143. Accordingly, upon operation of the air cylinder 139, the positioning members 137 are moved in parallel relation such that they project laterally of the base body 117 and come into contact with the traced surface described later.

Flaw detecting work will now be described with reference to FIGS. 25 to 28. In this embodiment, the ultrasonic flaw detecting device 111 is employed to perform ultrasonic flaw detection around weld joints of the stub tubes 106. The following description is proceeded in sequence of successive steps.

Figure 25:
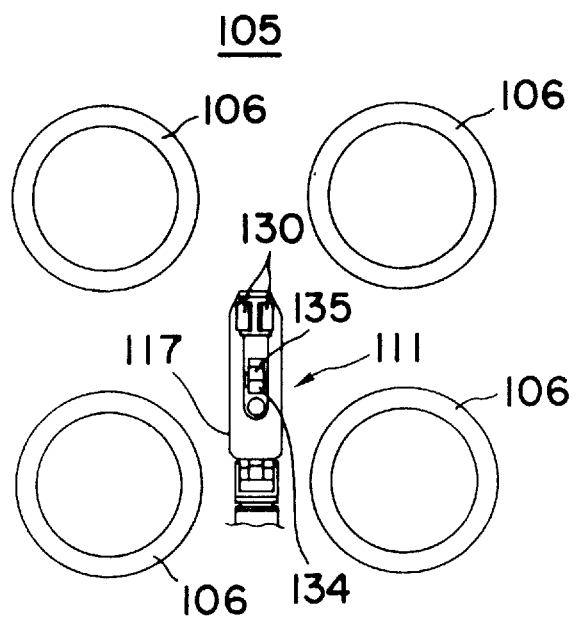
FIG. 25 is a view for explaining operation of the third embodiment.

First, by pushing the cable bearer 50 downward, the ultrasonic flaw detecting device 111 is advanced in its entirety to the gap area between the stub tubes 106 (FIG. 25).

Figure 26:
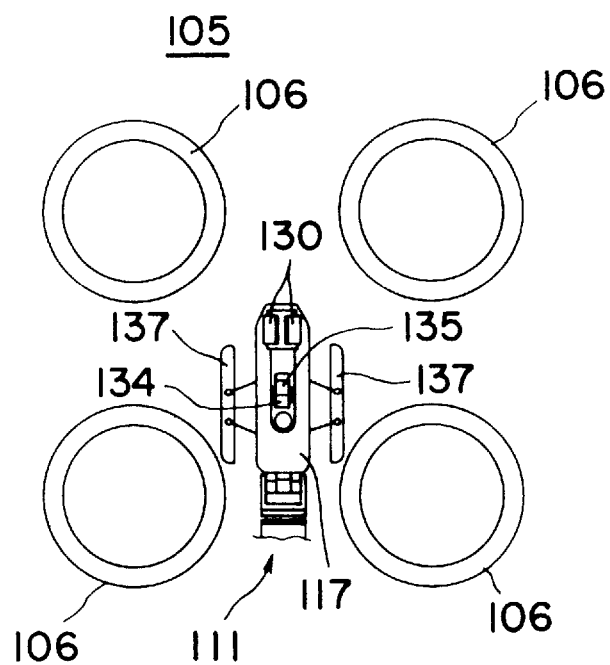
FIG. 26 is a view for explaining operation of the third embodiment.

Then, the positioning means 136 is driven to stretch out the positioning members 137 and, at the same time, the position of the ultrasonic flaw detecting device 111 in the direction of advance of the cable bearer 50 is adjusted. The ultrasonic flaw detecting device 111 is stopped in a position where the positioning members 137 contact the stub tubes 106 on both sides (FIG. 26).

Figure 27:
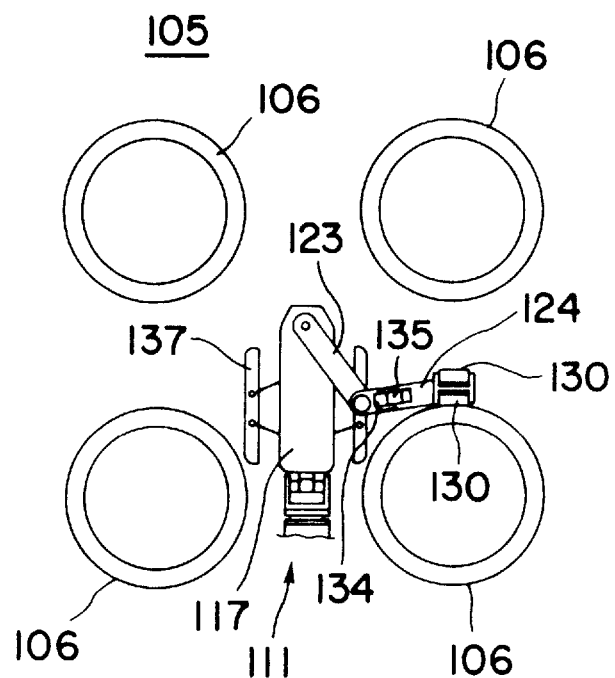
FIG. 27 is a view for explaining operation of the third embodiment.

Thereafter, the first arm 123 and the second arm 124 are turned to bring the ultrasonic probe 130 into contact with the stub tube 106, followed by starting the flaw detection (FIG. 27). Subsequently, the ultrasonic probe 130 is moved along the surface of the stub tube 106 while it is kept in contact there with, by adjusting rotational angles of the first arm 123 and the second arm 124. Since the probe holder 129 is itself rotatable, the ultrasonic probe 130 can contact the surface of the stub tube 106 in vertical relation even with the second arm 124 turned.

Figure 28:
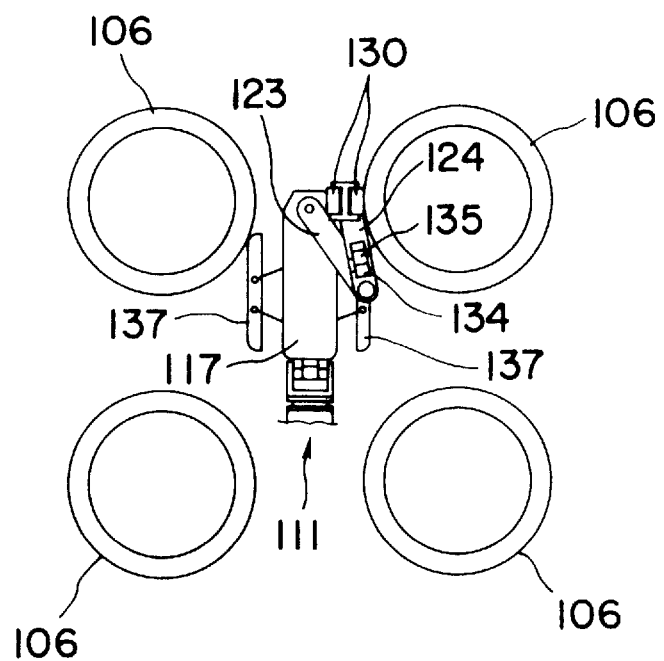
FIG. 28 is a view for explaining operation of the third embodiment.

Furthermore, as shown in FIG. 28, the ultrasonic flaw detection can be performed on the stub tube 106 located forward of the ultrasonic flaw detecting device in a like manner. Because the position of the ultrasonic flaw detecting device is uniquely determined with respect to the stub tube 106 from the spacing between the positioning members 137 when they are opened, the position of the ultrasonic probe 130 with respect to the stub tube 106 can be determined from the rotational angles of the first arm 123 and the second arm 124 at that time. Then, a defect echo is detected by the ultrasonic probe 130 and the position of a defect or flaw is identified from the position of the probe.

Through the above-described steps, the ultrasonic flaw detection can be performed around each of the stub tubes 106.

According to this embodiment, therefore, in contrast with the prior art wherein a number of control rod guide tubes must be removed for inspecting around weld joints of the foot mirror 105 and the stub tubes 106 by ultrasonic flaw detection because the detection cannot be made unless the control rod guide tube is removed for each position, it is possible to reduce the number of control rod guide tubes to be removed and to perform the ultrasonic flaw detection over a wide area with the reduced number of times that the apparatus is installed. Further, since the ultrasonic flaw detection can be easily performed in a shorter time, the working efficiency can be improved and the term of works can be cut down.

Other Embodiments

In addition to the foregoing embodiments, the present invention is also applicable to other various works. For example, the stub tubes 106, etc. may be cut by attaching, as the working means, any cutting device such as an EDM (Electrical Discharge Machining) cutting device or a disk grinder to the distal end of the cable bearer 50. By employing the apparatus equipped with such a cutting device, when the stub tubes 106 are to be cut, it is possible to reduce the number of control rod guide tubes to be removed, and perform the cutting work over a wide area with the reduced number of times that the working apparatus is installed. As a result, the cutting work can be easily implemented in a shorter time.

Similarly, by employing a grinding device such as a grindstone as the working means, when cut end faces of the stub tubes 106 are to be ground, it is possible to reduce the number of control rod guide tubes to be removed, resulting in the improved working efficiency and the shorter term of works, as with the above case.

Further, by employing a welding device as the working means, when new stub tubes are to be welded after cutting the existing stub tubes, it is possible to reduce the number of control rod guide tubes to be removed, resulting in the improved working efficiency and the shorter term of works, as with the above cases.

As fully described hereinabove, the present invention can provide many advantages in functions and effects as mentioned hereinbefore.

Further, it is to be noted that the present invention is not limited to the described embodiments and many other changes and modifications may be made without departing from the scopes of the appended claims.

What is claimed is:

1. An apparatus for carrying out work at a reactor bottom, the work includes at least one of inspecting, cleaning and recovering radioactive corrosion products and other foreign matters deposited or stuck onto a foot mirror of a reactor pressure vessel in a light-water cooling reactor, and cutting, grinding and welding structural members in relation to the foreign matters, said apparatus comprising:

a body case having a shape of a vertically long tube, having an opening formed in a peripheral surface thereof, said body case being suspended from above the reactor pressure vessel to be installed over an upper end of a control rod driving mechanism housing which is vacant after withdrawal of a control rod driving mechanism from the housing;

a turning mechanism for turning said body case about an axis thereof and setting a direction of the opening of the body case;

working means housed in the body case;

a developing mechanism for projecting and retracting said working means laterally outward through said opening with respect to the body case;

a lifting mechanism for moving said working means up and down with respect to the body case; and a transfer mechanism for three-dimensionally transferring said working means, which has been descended by said lifting mechanism, along an upper surface of said foot mirror, said transfer mechanism comprising a linear guide member holding said working means at a distal end thereof, extending downward from said lifting mechanism and being bendable in one direction, and a tip oscillating mechanism provided at a distal end of said guide member and having a degree of freedom for actively moving said working means on a horizontal plane, a degree of freedom for moving said working means in the vertical direction and a degree of freedom for rotating said working means about an axis thereof in a direction in which said working means is to be transferred.

2. An apparatus for carrying out work at the reactor bottom according to claim 1, wherein said transfer mechanism further comprises a monitoring camera for monitoring an advancement condition of said guide member and said transfer mechanism moves the working means into a gap area between stub tubes while following a curvature of said foot mirror of the reactor pressure vessel.

3. An apparatus for carrying out work at the reactor bottom according to claim 1, wherein said transfer mechanism further comprises a camera for monitoring a work condition of said working means, and said transfer mechanism moves said working means into a gap area between stub tubes while following a curvature of said foot mirror of the reactor pressure vessel.

4. An apparatus for carrying out work at the reactor bottom according to claim 1, wherein said working means is an inspecting device comprising a camera for visually inspecting surfaces or weld joints of the structural members at the reactor bottom and light means for illumination.

5. An apparatus for carrying out work at the reactor bottom according to claim 1, wherein said linear guide member constituting said transfer mechanism and being bendable in one direction is a cable bearer, and said tip oscillating mechanism provided at a distal end of said cable bearer includes an electric-powered actuator as a driving source for moving said working means on a horizontal plane.

\* \* \* \* \*